United States Patent [19]
Cadot

[11] Patent Number: 5,495,605
[45] Date of Patent: Feb. 27, 1996

[54] METHOD TO HELP IN OPTIMIZING A QUERY FROM A RELATIONAL DATA BASE MANAGEMENT SYSTEM, AND RESULTANT METHOD OF SYNTACTICAL ANALYSIS

[75] Inventor: Michel Cadot, Saint-Maur, France

[73] Assignee: Bull S.A., Paris, France

[21] Appl. No.: 128,222

[22] Filed: Sep. 29, 1993

[30] Foreign Application Priority Data

Oct. 12, 1992 [FR] France .................... 92 12149

[51] Int. Cl.$^6$ .............................. G06F 9/00; G06F 15/00
[52] U.S. Cl. .................... 395/600; 395/700; 395/157; 364/DIG. 1; 364/282.1; 364/280.5; 364/286.3
[58] Field of Search .................... 395/600, 700, 395/157; 364/DIG. 1, DIG. 2

[56] References Cited

U.S. PATENT DOCUMENTS

| | | | |
|---|---|---|---|
| 4,769,772 | 9/1988 | Dwyer ................................. | 364/300 |
| 4,829,427 | 5/1989 | Green ................................. | 364/300 |
| 4,887,218 | 12/1989 | Natarajan ........................... | 364/468 |
| 5,091,852 | 2/1992 | Tsuchida et al. .................... | 395/600 |
| 5,113,354 | 5/1992 | Harper et al. ...................... | 364/514 |
| 5,195,178 | 3/1993 | Krieger et al. ..................... | 395/157 |
| 5,307,445 | 4/1994 | Dalal et al. ....................... | 395/66 |
| 5,317,742 | 5/1994 | Bapat ................................ | 395/700 |
| 5,331,554 | 7/1994 | Graham ............................ | 364/419.07 |
| 5,335,345 | 8/1994 | Frieder et al. ..................... | 395/600 |
| 5,345,585 | 9/1994 | Iyer et al. ......................... | 395/600 |

OTHER PUBLICATIONS

Proceedings of the Fifth Int'l Conf. on Data Engineering Feb. 10, 1989 pp. 590–597 Ching Ooi et al. "Extending a DBMS for Geographic Applications".

*Primary Examiner*—Thomas G. Black
*Assistant Examiner*—Jean R. Homere
*Attorney, Agent, or Firm*—Kerkam, Stowell, Kondracki & Clarke; Edward J. Kondracki

[57] ABSTRACT

The method for help in optimizing a query (10) in a window (24) of a screen of a work station consists of forming a tree (26) representative of the execution plan of the query, representing the tree on the screen (25), making a syntactical analysis of the query in order to form a syntactical graph, comparing the elements of the tree with those of the graph, and completing the tree with elements contained only in the graph. The advantageous result is a method of syntactical analysis consisting of analyzing the function of the RDBMS in order to determine in particular the types of nodes of the syntactical graph and preferably the information associated with these type of nodes.

14 Claims, 19 Drawing Sheets

| OPERATION | OPTIONS | OBJECT_OWNER | OBJECT_NAME | ID | PARE | POSI |
|---|---|---|---|---|---|---|
| NESTED LOOPS | | | | 1 | | 0 |
| NESTED LOOPS | | | | 2 | 1 | 1 |
| NESTED LOOPS | | | | 3 | 2 | 1 |
| NESTED LOOPS | | | | 4 | 3 | 1 |
| TABLE ACCESS | FULL | SYS | OBJ$ | 5 | 4 | 1 |
| TABLE ACCESS | CLUSTER | SYS | CLU$ | 6 | 4 | 2 |
| INDEX | UNIQUE SCAN | SYS | I_OBJ* | 7 | 6 | 1 |
| TABLE ACCESS | CLUSTER | SYS | SEG$ | 8 | 3 | 2 |
| INDEX | UNIQUE SCAN | SYS | I_FILE#_BLOCK* | 9 | 8 | 1 |
| TABLE ACCESS | CLUSTER | SYS | TS$ | 10 | 2 | 2 |
| INDEX | UNIQUE SCAN | SYS | I_TS* | 11 | 10 | 1 |

| OPERATION | OPTIONS | OBJECT_OWNER | OBJECT_NAME | ID | PARE | POSI |
|---|---|---|---|---|---|---|
| TABLE ACCESS | CLUSTER | SYS | USER$ | 12 | 1 | 2 |
| INDEX | UNIQUE SCAN | SYS | I_USER* | 13 | 12 | 1 |

13 rows selected.

FIG.1

```
File     Query     Explain

Help

View:  SYS.DBA_CLUSTERS select u.name, o.name, ts.name,
c.pctfree$, c.pctused$, c.size$, c.initrans, c.maxtrans,
s.iniexts * ts.blocksize, s.extsize * ts.blocksize,
s.minexts, s.maxexts, s.extpct
from sys.user$ u, sys.ts$ ts, sys.seg$ s, sys.clu$ c, sys.obj$ o
where o.owner# = u.user#
and o.obj# = c.obj#
and c.ts# = ts.ts#
and c.ts# = s.ts#
and c.file# = s.file#
and c.block# = s.block#
```

FIG.2C

```
SELECT   *
FROM     T1
WHERE    EXISTS
         (SELECT  *
          FROM    T2
          WHERE   T1.c1=T2.c2)
```
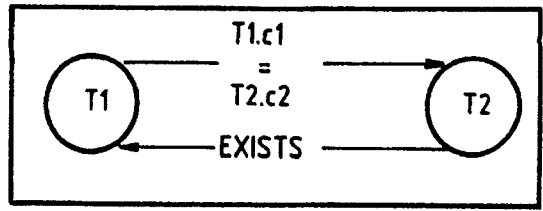
```
SELECT   *
FROM     T1,T2,T3
WHERE    T1.c1=T2.c2
         +T3.c3
```
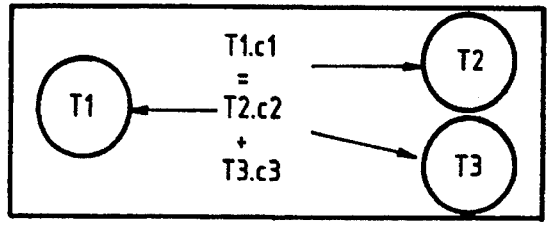
FIG.5G
```
SELECT   *
FROM     T
```
```
SELECT   COUNT(*)
FROM     T
```
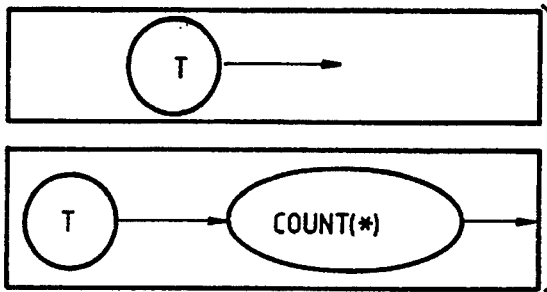
FIG.5H
```
SELECT   1000*c1
FROM     T
```
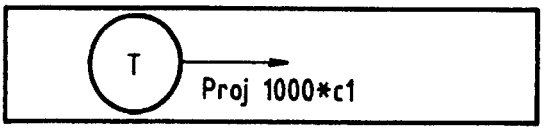
FIG.5I
```
SELECT   c1,SUM(c2)
FROM     T
```
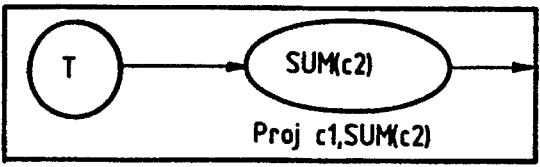
FIG.5J

```
SELECT   *
FROM     T1
WHERE    c1=
         (SELECT c2
          FROM   T2
          WHERE  T1.c3=T2.c4)
```

```
SELECT  1000*c1,SUM(c2)
FROM    T
```

```
SELECT  *
FROM    T
WHERE   c1=c2
AND     c1=1
```

```
SELECT  c1
FROM    T
WHERE   c1=1
HAVING  AVG(c1)=1
```

```
SELECT    D.name,SUM(E.sal)
FROM      DEPT D,EMP E
WHERE     D.dept#=E.dept#
GROUP BY  D.dept#,D.loc
HAVING    AVG(E.sal) >=
          (SELECT   1000*COUNT(E2.emp#)
           FROM     EMP E2
           WHERE    E2.dept#IN (SELECT   D2.dept#
                    FROM     DEPT D2
                    WHERE    D2.loc=D.loc
                    AND      D2.loc='DENVER')
```

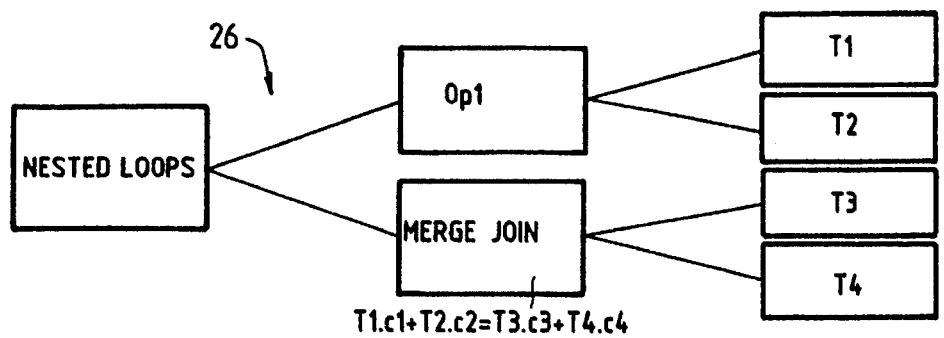
FIG.9D
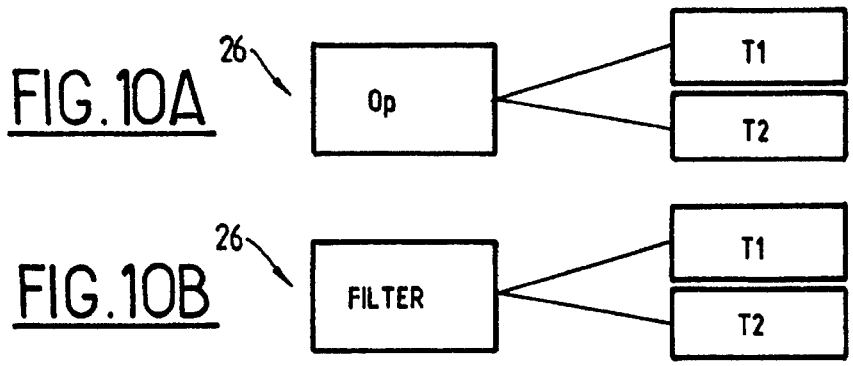
FIG.10A
FIG.10B
T1.c1 IN flow of the second branch
```
Select   type,avg(price)
From     TYPE,MARK
Where    TYPE.mark = MARK.mark
Having   avg(price) > 1000
```
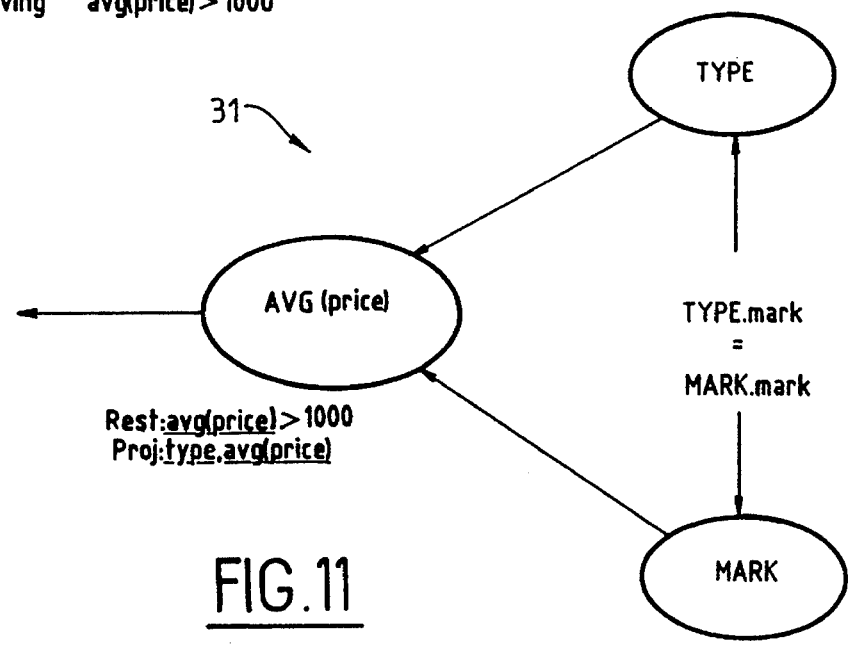
FIG.11

METHOD TO HELP IN OPTIMIZING A QUERY FROM A RELATIONAL DATA BASE MANAGEMENT SYSTEM, AND RESULTANT METHOD OF SYNTACTICAL ANALYSIS

BACKGROUND OF THE INVENTION

The invention relates to a method to help in optimizing a query from a relational data base management system, more currently known by its acronym RDBMS. More particularly, it applies to the administration of the RDBMS. It also relates to a method of syntactical analysis resulting therefrom.

A data base may be defined as an integrated set of data that model a given universe. The data used by various applications are grouped in the same base in such a way as to avoid the problems of data duplication. Associated with a data base is a conceptual schema that describes the structure and type of the data that it contains and the constraints, which must always be verified. The data base administrator has the task of making sure of the verification of these constraints.

The data administration has three roles. First, it defines the data base users by assigning them a name, a password, and a set of privileges or rights for access to the data. It also defines the administrator or administrators, who are the persons authorized to handle all or part of the administration of the data base. The second role of the administration is to assign to the administrator, or cause him to participate in, the definition of the conceptual schema of the data base. The administrator thus defines the schemas of the various tables and the rules relating to these tables. In his final role, the administrator has possibility of benefitting, in terms of performance, integrity and security, from the conceptual schema of the base and of the RDBMS. It is this third role upon which the subject of the present invention essentially bears.

When an RDBMS application is being developed, the role of an administrator is to optimize the use of the RDBMS's resources. When a query is made at the time of the application, the RDBMS chooses an access route for executing the query. To optimize the performance of the application, the administrator must analyze the queries sent and decide on the action to be taken. His action may be to change the form of the query, and/or to create or delete indexes in the tables concerned. His decision depends on the information that indicates to him whether or not the current form of the query is adequate, or whether the existing indexes are pertinent.

The indexes are physically independent of the data and may thus be deleted and created at any moment. An index is used at the time of access to the data, regardless of who created it. A table may have several indexes at the same time. A compromise must be made between the number of indexes and the overhead involved in updating them. An index may apply to more than one column, and in that case it can assure the uniqueness of the columns used. It also improves the performance of the queries for which the selection condition will affect more than one column. A query with more than one predicate can use multiple indexes, if they are unique, if the predicates are equalities and are defined in the same table. In that case, the partial results from each index are merged to constitute the definitive result. Some RDBMS are capable of using the properties of indexes and the characteristics of columns to decide which index to take and which to avoid for the merge operation. Whether or not to use an index is decided by the RDBMS optimizer. The decision varies depending on the type of RDBMS.

On the other hand, the schema of an RDBMS may evolve dynamically. For example, one or more fields may be added to a table, and indexes may be created in a table. In this context, it may happen that the RDBMS does not encounter an index that it must use, or encounters an index that it must not use, for example if access is being gained to more than 10% of the articles. In this latter case, the index becomes a hindrance. Given all the possibilities in choice of the RDBMS to set up its plan, it is estimated that the utilization of the resources can vary within a ratio of 1:10,000, depending on the formula of the query and the choice of indexes.

At present, optimizing a query is complicated. First, it is not automatic, and specific RDBMS tools must be used to request the plan of execution of the query. This plan is the concatenation of operations to be executed by the data base server in order to process the query. To request this plan, the user must write the query in the language of the RDBMS. Hence, writing the query requires good knowledge of the query language of the RDBMS. Moreover, it is rigorous and arduous work and involves a great loss of time, aggravated by the risks of mistakes that ensue. In response, the RDBMS furnishes the results of the request of the execution plan of the query, in a variable form depending on the RDBMS. The plan is written in the query language of the RDBMS and is currently present in the form of a long table with multiple columns, for example. The table is written in linear mode and appears on the screen only one page at a time. Analyzing the table is accordingly highly complicated, and the user ordinarily makes his task easier by requesting a printout of the table on paper. This means that he must go through all the printing processes specific to that terminal. The printout is done page by page, with column headings repeated each page. Consequently, in the coded language, the administrator must decrypt the hierarchy of processing the query and reconstitute the plan by analyzing numerous columns and a large number of disordered lines on various pages. This makes the search long and difficult. Moreover, the administrator does not have a global view of the plan available, which would ordinarily be too long to obtain and would be overly bothersome in proportion to the advantage he would gain from it. Nevertheless, the administrator must overcome this disadvantage as well as he can, in order to decide how to optimize the query. For example, if he modifies the query, he must rewrite the modified query, analyze the new table, and compare it with the old table. The tools used to create an analysis table do not save the preceding table in memory, and hence it must be printed out in order to be able to refer to it to make the comparison with the new table. In practice, the comparison accordingly consists of gathering the long, difficult analyses of the two tables. Finally, the administrator lacks a visual display of information about the objects used in the processing. It will be appreciated that under these conditions, optimizing a query is difficult to achieve rapidly, even for a skilled administrator.

One approach has been proposed to make the visual display and interpretation of the plan of execution of a query easier, so that the processing of the query can be optimized rapidly, at less cost. This approach had the dual advantage of offering graphical representation of the execution plan of the query and of being independent of the optimizer and of the RDBMS query language. In a preferred variant embodiment of this approach, this optimizing help could even be achieved by any user who does not know the query language of the RDBMS. This approach is described in the copending French patent application of the present applicant, filed on Oct. 12, 1992 and having the serial number 92 12148 and corresponding U.S. application of Eric Vachey, U.S. Ser. No. 08/128,159 (BULL 3360) filed concurrently herewith.

This copending patent application proposes a method to help in optimizing a query of an RDBMS, including the search for the plan of execution of the query written in the query language of the RDBMS, characterized in that it consists of constructing a tree, on the basis of this search, that represents the plan of execution of the query, and representing the tree on a screen.

This tree appears in the form boxes connected to one another by their links of affiliation. Each of the boxes of the tree has a heading giving the name of the operation concerned and a subheading giving its possible option. Advantageously, a possible characteristic of the operation is added here, such as the name of the object, and optionally the name of the owner of the object to which the operation applies. An improvement consists of writing this characteristic in a button of the box and clicking on the button to request additional information about the object relating to the button. For example, if the operation being performed on the object that is clicked on is a table, then the additional information includes elements that describe the table. On the other hand, if the operation on the object clicked on is an index, then the additional information includes a histogram.

In summary, the data furnished by the tree for execution of a query may be all the data contained in the execution plan written in the query language of the RDBMS. Thanks to the invention, the user can also obtain additional information about some of these data. It will be appreciated that this tree furnishes the user with a powerful tool to help in optimizing a query.

Research into increasing the power has been done. One major problem presents a stumbling block, as will be illustrated by a very simple example to facilitate comprehension. Let it be assumed that the RDBMS working in SQL is handling automobile shipping and contains a table known as Type_Car. For example, in its columns this table includes the type of vehicle, model name "Mark", the price "Price", and the power "Power". Let it now be assumed that the user of this table requests the vehicle types having the model name XXX. The user will then write the following query in the SQL language:

SELECT Type
FROM Type_Car
WHERE Mark='XXX'

The table representing the execution plan of this query accordingly takes into account only the objects of the query, that is, Type_Car. In the query, the other elements relating to the WHERE clause indicate to the RDBMS only that it should refer to the column "Mark" and there select the model XXX and the elements relating to the SELECT clause indicating to the RDBMS that it should return only the "Type" information in the result. However, it is clear that these elements are not taken into account in the table representing the execution plan of the query. In other words, this table loses the other elements of the request, that is, Type, Mark and the notation XXX in the query illustrated.

Since the execution tree of the query is constructed from the table representing the plan of execution of this query, the elements lost from this table cannot appear in the tree. It is consequently impossible to incorporate these lost elements into the tree by using the prior art method for help in optimizing the query. This made it impossible to improve the help provided.

Yet incorporating these lacking elements into the boxes of the tree would offer the user numerous advantages. First, the notation Mark='XXX' would have the advantage of being an image of the query. The table representing the execution plan of the query would include not only the results of the search for the execution plan of the query, but also the condition that led to those results. It must be understood that the above example has intentionally been simplified to the maximum, and that in practice a query is much more complicated. Inserting all the elements of the query would procure for the user a real image of this query, in addition to its result, and would make him better able to understand their relationship. This appreciation of their relationship would have the major advantage of limiting the choice of modifications to be made for optimizing the query, and of better formulating the modifications. In other words, a user who is a nonspecialist in the query language of the RDBMS would be provided with fast, easy help in attaining the best possible optimization of query execution, because incorporating the lacking elements provides a highly valuable guide in achieving this help.

SUMMARY OF THE INVENTION

The invention introduces a method that makes it possible to obtain all or some of the descriptive elements of a query for the sake of simple and rapid help for a user, even one who is not a specialist in the query language of the RDBMS, to best optimize execution of the query.

The subject of the invention is a method for helping optimize a query of an RDBMS, including the formation of a tree representative of the execution plan of the query and representing it on a screen, characterized in that it consists of making the syntactical analysis of the query in order to form a syntactical graph, comparing the elements of the tree with those of the graph, and supplementing the tree with elements contained only in the graph.

As a corollary, the subject of the invention is also a method of syntactical analysis of an RDBMS query, characterized in that it consists of analyzing the function of the RDBMS in order to determine in particular the types of nodes of the syntactical graph, and preferably the information associated with these types.

The syntactical analysis may include the determination of the operations executed by the RDBMS and the order in which these operations are executed. This order has the advantage of establishing a relationship between the query and the execution plan. It also has the advantage of defining the conditions by which the types of nodes of the graph and the associated information are determined.

BRIEF DESCRIPTION OF THE DRAWINGS

The characteristics and advantages of the invention will become apparent from the ensuing description, given by way of example and illustrated in the accompanying drawings.

In the drawings:

FIG. 1, taking the prior art as an example, illustrates a representative table of the execution plan written in the query language of an RDBMS and relating to the query shown in FIG. 2C;

FIGS. 2A, 2B and 2C illustrate log-on screens obtained from a tool according to the invention that employs the method of the invention;

FIGS. 9A–9D illustrate a first example of placement of tests for associating the tree with the graph;

FIGS. 10A–10B illustrate a second example of placement of tests for associating the tree with the graph;

FIG. 11 illustrates a representative network for a complete query obtained by employing the method of the invention;

FIGS. 12A–12H show various steps in an embodiment of the method of the invention.

DESCRIPTION OF THE PREFERRED EMBODIMENTS

Figure 2A:
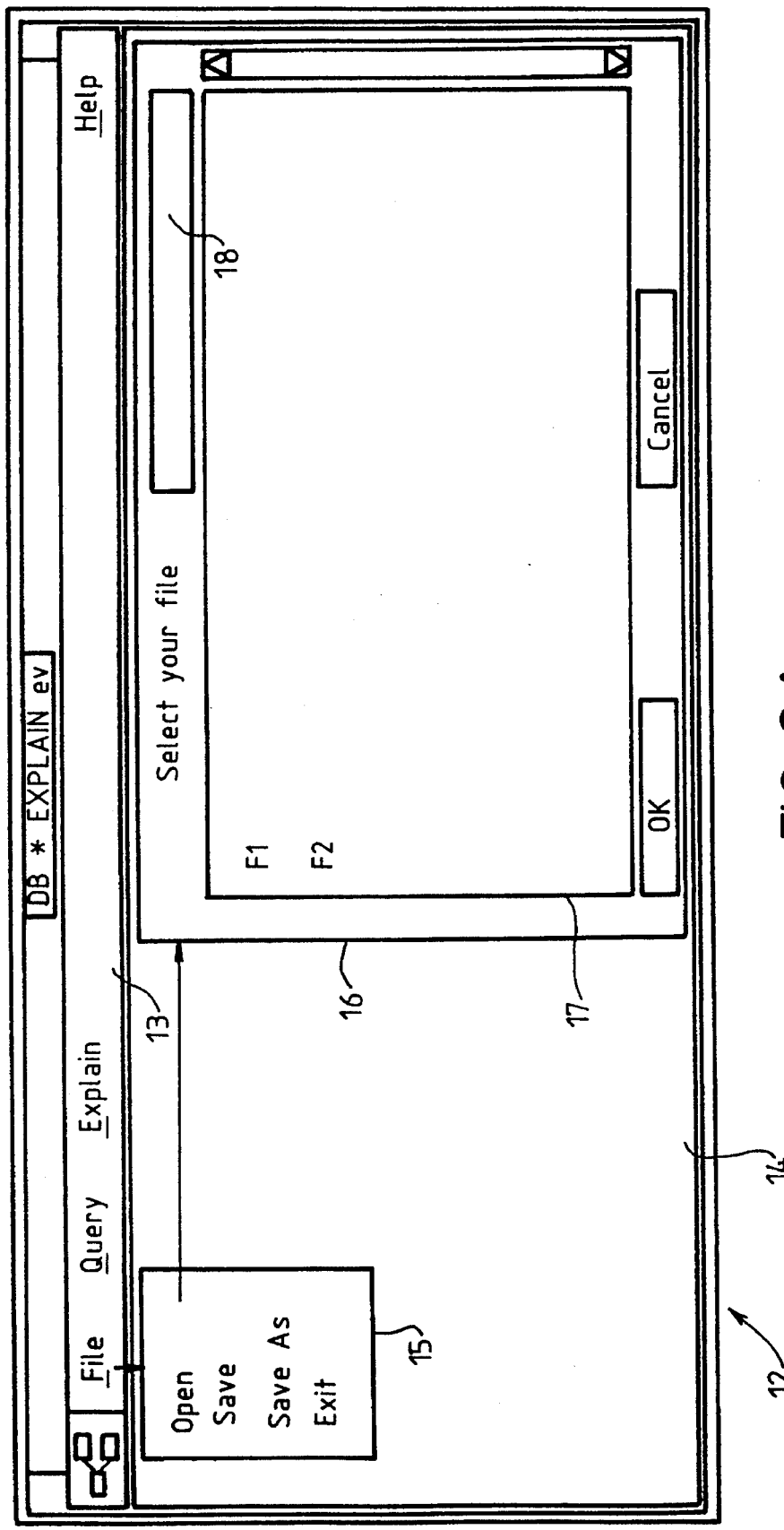

For the sake of clarity and simplicity, the description will pertain to a non-limiting example of RDBMS known by the registered trademark Oracle V6, produced by the Oracle Corporation and using the standard-sized language SQL (Structured Query Language) and running on a Unix station, the latter being a trademark registered by American Telephone and Telegraph. The example shown will relate to queries of the SELECT type in this RDBMS, it being understood that this example is limiting neither to this type in this RDBMS nor to other RDBMSs.

The functional architecture of Oracle is organized in four concentric layers, which in order, beginning at the center, are the core, the dictionary, the SQL layer, and the outer layer. The first three layers are called fundamental layers.

The core communicates with the data base and can connect with other cores in a distributed data base environment. One of its essential functions is the optimal execution of queries, thanks to an integrated SQL query optimizer.

The data dictionary is a metabase. It is made up of a set of tables and views that are manipulated with the aid of the SQL language. Its contents reflect an image of the base at any moment and thus provides a dynamic description of the data base. In particular, it makes it possible to describe the objects of the base (tables, columns, views, indexes, etc.) and the privileges and rights of the users with respect to the various objects. The dictionary is used for the administration of the data base if the user has an administration privilege. A user is considered to be an administrator if he has the DBA privilege. When the system is installed, two users are considered as administrators: SYS and SYSTEM. Only the SYS administrator has access to the data dictionary tables.

The SQL layer is the last fundamental layer of Oracle. It plays the role of an interface between the core and the tools of the outer layer. Hence any operation of access to the data is expressed in SQL language.

Finally, the outer layer is composed of tools that facilitate the development of applications and the use of all the functions offered by the three fundamental layers. One of these tools is SQL*Plus, which is an interactive fourth-generation interface with the SQL layer. Any SQL command may be started from SQL*Plus. It makes it possible in particular to parametrize the working environment (length of a line per pages—number of lines per page, etc.) and formatting the results of the SQL queries on the screen or on paper. Another tool is SQL*DBA, oriented toward administration of the data base.

For good comprehension of the present invention, the major operations of Oracle will be recalled very briefly:

CONCATENATION: execution of the OR operation by calling up indexes. Oracle offers two ways of executing an OR operation.

FILTER: If this operation has two branches, then for each tuple of the first son, the existence of a flow originating in the second son is verified. If this flow exists, then FILTER allows the tuple to pass. This operation occurs in the SELECT clauses involved. If the FILTER has only one branch, its algorithm is different to allow the tuples that make a binary value formula true to pass. This operation then replaces the HAVING clause.

INDEX: makes access to an index. This operation can appear alone or followed by a TABLE ACCESS operation, depending on whether the values in the index are used directly or serve to select tuples from the table.

MERGE JOIN: This is the only operation that performs a merge join. It effects the merger of two previously sorted sets. It is used for joins whose test is an equality and for which no field has been indexed.

NESTED LOOPS: for each tuple originating from the first son, the cartesian product with the tuples originating in the second son is taken.

TABLE ACCESS: makes access to a table and is capable of making restrictions.

SORT UNIQUE: Elimination of pairs made with the merge operations UNION, MINUS, INTERSECT and used for the UNIQUE option of the SELECT clause.

SORT JOIN: Performs sorting of the fields of the join with the MERGE JOIN operation.

SORT ORDER BY: Sort by the specifications of the ORDER clause.

SORT GROUP BY: Executes the groups of SELECT and HAVING clauses and sorts in accordance with the specifications of the GROUP BY clause.

The conventional method for helping and optimizing a query of an RDBMS includes searching for a plan of execution of the query written in the query language of the RDBMS. FIG. 2C, in a window on a screen, shows an example of a query 10 written in the query language SQL of Oracle. In Oracle, the search for the plan of execution of the query 10 can be made by using the tool SQL*Plus or SQL*DBA. The query 10 is written, and in response the tool constructs a table representing the plan selected by the core of RDBMS in order to execute the query. This table must be created beforehand by the user and may be consulted by the SQL selection commands.

FIG. 1 shows a very brief example, for the sake of convenience, of a table 11 obtained by printout page by page of the corresponding table that has been created by the RDBMS upon the request of the user. The table 11 is composed of two pages, each repeating the headings of seven representative columns, which in succession are operations (OPERATION), options (OPTION), the owner of the object (OBJECT_OWNER), the name of the object (OBJECT_NAME), and for each operation, its number (ID), the number of the preceding operation (PARE) and its position (POSI) if the operation has sister operations. The simple query 10 illustrated in FIG. 2C provides some idea of a table relating to an ordinary query and is a good illustration of the serious problem the user is presented with in optimizing the execution of the query. In practice, only if the administrator is a skilled user can he interpret this table. It will also be understood that even for the administrator, interpreting the table is as a rule generally time-consuming and difficult. Moreover, in this way he has no global overview whatever of the execution plan. The invention presents a solution that makes it unnecessary to consult a person with highly sophisticated knowledge of the administration of an RDBMS.

In one characteristic of the invention, a searching tool called DB*EXPLAIN has been created in order first to propose to the user that the table representing the execution plan of a query be created automatically. In an accessory advantage of this tool, the administrator does not have to write a query in the SQL language.

Figure 2B:
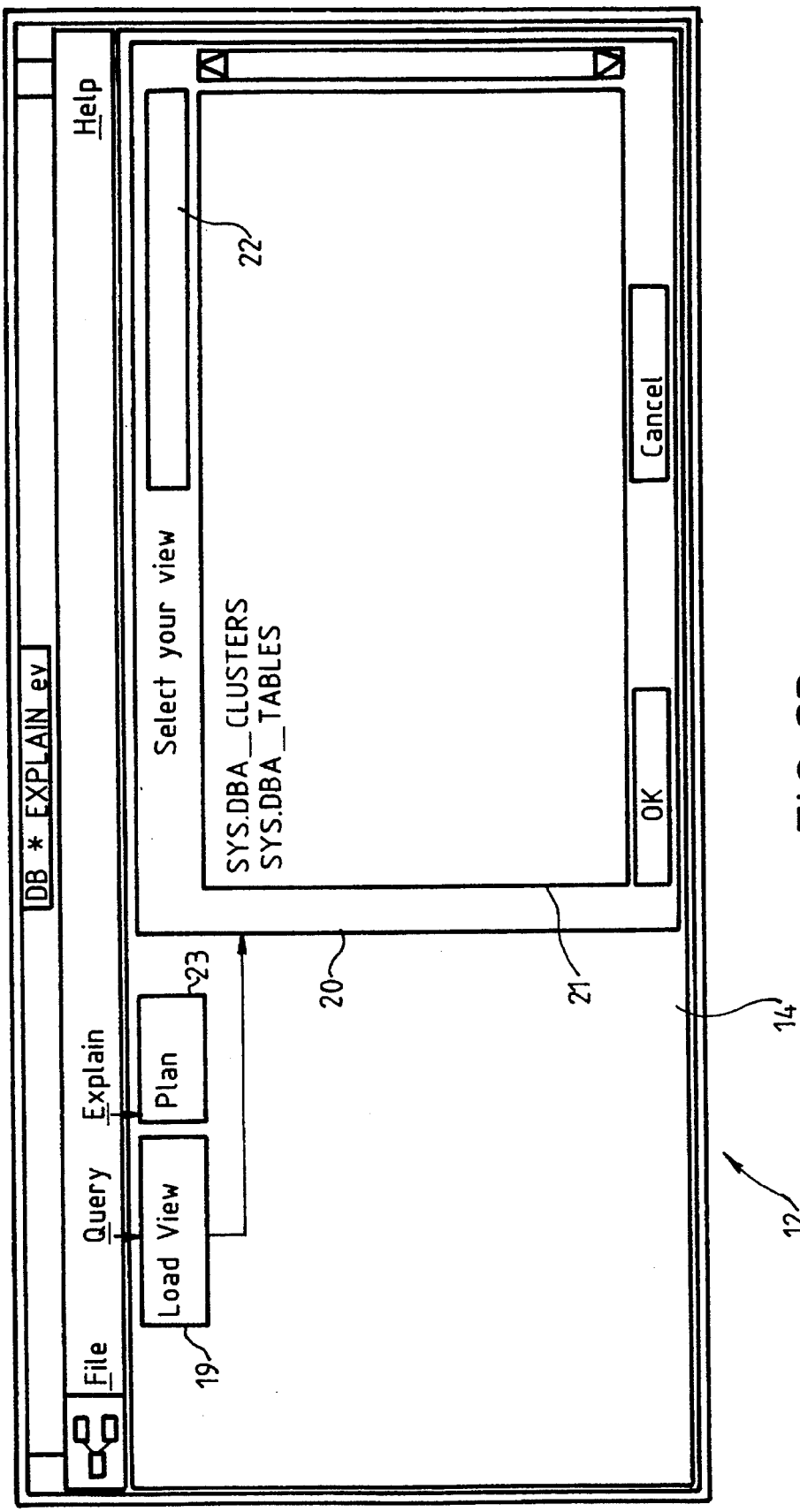

FIGS. 2A, 2B and 2C by way of example illustrate a log-on screen 12 of the tool DB*EXPLAIN. This example has been created using the OSF/Motif software, this being a trademark registered by Open Software Foundation, Inc. in the United States. The screen 12 contains a menu bar 13 and a dialog window 14. The menu bar 13 includes three main menus, File, Query and Explain. The File menu 15 is represented by FIG. 2A and pertains to the queries obtained in the files. It presents four options, Open, Save, Save As, and Exit. By clicking on the Open option, a selection window 16 appears in the dialog window 14. The selection window 16 in standardized fashion incorporates a scrolling list 17 of current files (F1, F2, etc.) containing queries, and a box 18 making it possible to write the name of a file to be selected. By clicking on the Save option, of the File menu 15, the file desired is saved under the name it already has. By clicking on the Save As option, the file desired is saved under the name chosen and written by the user. Finally, one clicks on the Exit option to exit from DB*EXPLAIN.

FIG. 2B by way of example illustrates the query menu 19 in the log-on screen 12. It incorporates only a Load View option serving to open a selection window 20 that incorporates a scrolling list 21 of the views contained in the dictionary of the RDBMS as another source of queries (in the example shown, these views are SYS.DBA_CLUSTERS and SYS.DBA_TABLES) and a box 22 making it possible to write the name of a desired view. FIG. 2B also shows the explain menu 23, which incorporates only the Plan option. By clicking on this option, the tool DB*EXPLAIN constructs a representative table of the plan of execution of the query, advantageously in the same way as the tools SQL*Plus and SQL*DBA. Clearly, it would be possible to adapt the tool DB*EXPLAIN so that it can represent this table in an editing window, in the same manner as the table 11 shown in FIG. 1. However, the method of the invention adapted to the example shown has need of only the table in order to furnish a representation of the execution plan that is clearly better than the table 11 shown, so that in practice this representation is superfluous.

FIG. 2C illustrates an editing window 24 produced in the dialog window 14 in order to represent a query originating from a selected file among the scrolling list 17 or defined in the box 18 of the screen illustrated in FIG. 2B, or of the view selected in the scrolling list 21 or defined in the box 22 of FIG. 2B. FIG. 2C, in the editing window 24, shows the query 10 which is presented by way of example as having selected the view SYS.DBA_CLUSTERS in the list 21 of FIG. 2B. This view pertains to the clusters of the data base and belongs to the SYS administrator. Because of the tool DB*EXPLAIN, there is no longer any need to write an already available query. Thus this tool has the major advantage of making it unnecessary to design and rewrite the query and avoiding all the attendant risks of mistakes and lost time. Another advantage is the capability of directly and easily modifying the contents of the query that appears in the editing window 24, thanks to the use, in the embodiment chosen as a preferred example, of the OSF/Motif software.

One of the phases of the method of the invention consists of constructing an execution tree of the query, based on the execution plan of the query 10, and representing the tree on a screen. In the screen shown in FIG. 3, a window 25 contains a tree 26 representing the execution of the query 10. The tree 26 is made of boxes 27 connected to one another by links 28. The construction of the links 28 of the tree 26 has been done by analysis of the results of the request for the plan of execution in the query written in the query language of the RDBMS, this result being the table 11 for the RDBMS chosen by way of example. The analysis of the query 10 has advantageously been done in practice by structures in C language, which point to affiliated structures in order to construct a purely software graph. In a very simple example that is sufficient on its own for employing the method of the invention, the structure associated with each of the nodes constituted by the boxes 27 of the tree 26 may be produced simply on the basis of the table produced by Explain Plan in the following formula:

```
typedef struct node_{
    int             type;
    char            operation [30];
    char            options [30];
    char            object_name [30];
    char            object_owner_[30];
    int             id;
    int             parent_id;
    int             position;
    struct node_    * brother;
    struct node_    * child;
} Node;
```

Each time a tuple is rendered, one of the boxes 27 is created in the conventional manner, which is easy for one skilled in the art, for example using a graphical library function of the OSF/Motif software. Another exemplary embodiment adapted to the set of phases constituting the method of the invention will be seen later, with reference to the appended file named struct.h. In summary, in the tree 26 shown, the boxes 27 and their links 28 have been created by analysis of the query 10 in the table 11 that represents the execution plan. In the example shown in FIG. 3, the window 25 for showing the tree 26 is advantageously furnished by the tool DB*EXPLAIN under the Plan option and is accompanied by the name of the view and by the window 24 for editing the query 10 that have been shown in FIG. 2C.

The tree 26 may incorporate all or some of the information resulting in the search for the execution plan of the query written in the RDBMS query language, such as the information contained in table 11 of FIG. 1. For example, each box 27 has as a heading the name of the operation to which this box relates. Hence in FIG. 3 the names NESTED LOOPS, TABLE ACCESS and INDEX, which are shown in the OPERATION column of table 11 in FIG. 1, are seen. If the operation constituting the heading of a box 27 has an option being executed for a given object, then the name of this option may be mentioned in the box, advantageously as a subheading. Similarly, if the operation mentioned in the heading in a box 27 has characteristics such as the name of the object and the name of the owner of the object to which the operation option applies, all or some of these characteristics may be indicated in the box. All of these advantageous options of the invention are contained in the tree 26 shown in FIG. 3. Thus in the thirteen boxes 27 of the tree 26, the names of the thirteen operations mentioned in table 11 are found, supplemented with the possible option that is executed for a given object, the name of the object, and the name of the owner of the object. The tree 26 affords the advantage of being easily understood by any user, regardless of his skill in the query language of the RDBMS, and of furnishing him a global overview of the execution plan of the query. The user seeing the tree 26 can thus more easily and quickly decide on what action to take to optimize the query that has been made. On the other hand, thanks to the tool DB*EXPLAIN, it has been seen that the user need not write the query and can easily modify it in the editing window 24 of FIG. 2C. After modification, the administrator can have the new execution tree very quickly, in order to find out how effective his modification is. The tool affords the additional advantage of saving the preceding tree and thus enables the administrator to compare the two trees easily and quickly.

Naturally, these advantages may also be afforded without using the tool DB*EXPLAIN, and by using the conventional means for searching for the execution plan of a query in the query language of the RDBMS. The results of this search are shown in a table 11 in the RDBMS chosen by way of example, but it will be appreciated that they may be present in some other form, depending on the type of RDBMS. The analysis of these results will be easily adapted to their form by one skilled in the art in order to create an execution tree for the query.

In another characteristic of the invention, other information besides that furnished by the analysis of the results of the request for the execution plan may be obtained. For example, it is possible to obtain additional information about certain possible characteristics of an operation. In the example shown, the name of the object on which the operation is executed, constituting the heading of a box 27 and optionally the owner of this object, are written in a button 29 inserted in the box, in such a way that by clicking on the button 29, a user can obtain additional information about this object.

In the case where the operation that is executed on the object clicked on is a table (TABLE ACCESS in the boxes 27 in the example shown), the search for the additional information is made for example by means of an SQL request in the DBA_TAB_COLUMNS table of the Oracle dictionary. This table shows the structure of a table contained in the data base of the RDBMS, that is, the name of the columns and in particular with their types and sizes. The additional information can thus be all or some of the descriptive elements of the table mentioned in the box. It is accordingly possible to obtain the description of the table, for example, the name of the columns, and the type of the columns. By preference, the tool DB*EXPLAIN displays them in an appended window, not shown.

Figure 4A:
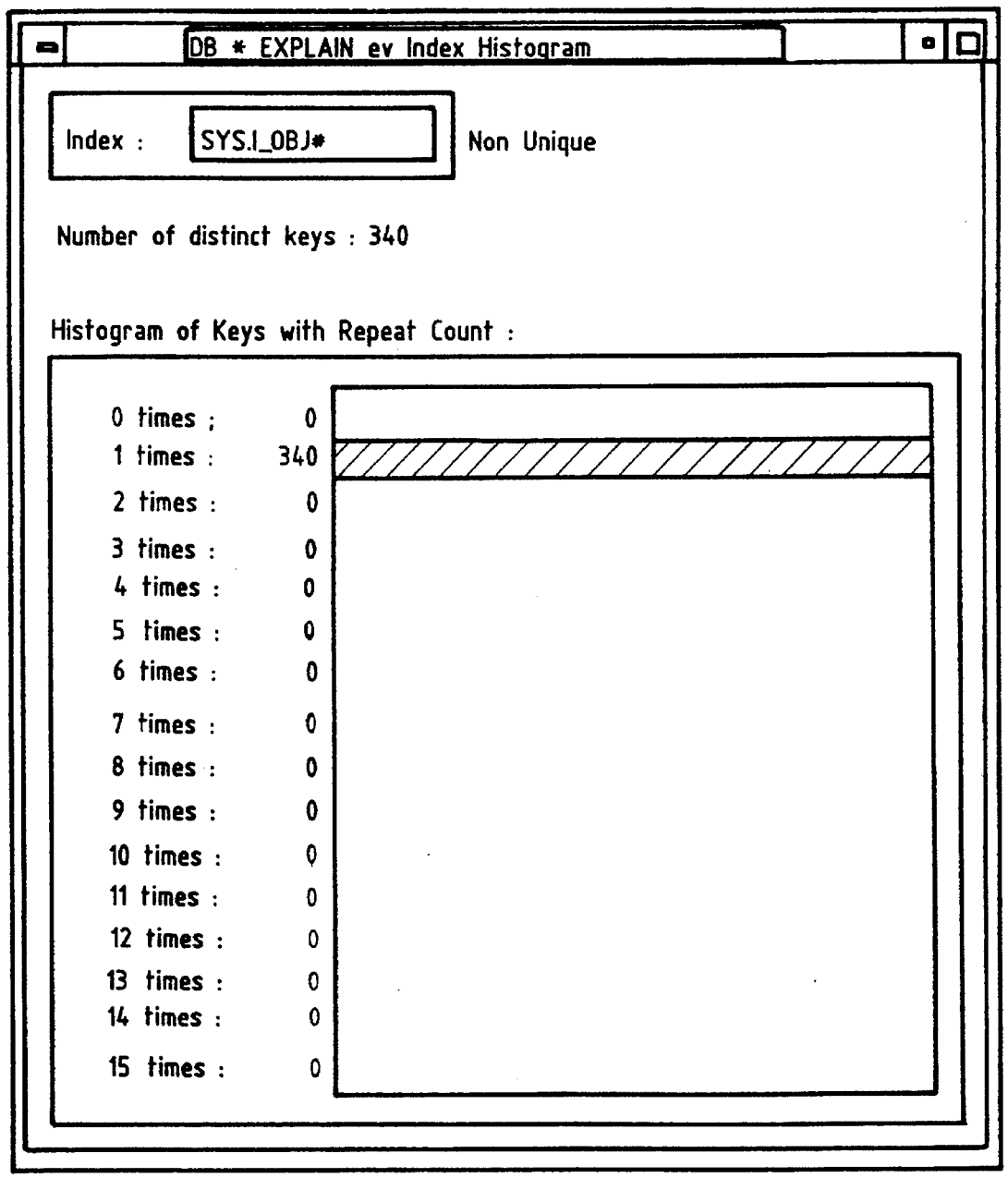
FIGS. 4A, 4B and 4C show histograms than can be obtained by employing the method of the invention.

If the operation being executed on the object clicked on is an index (INDEX in the boxes 27), then the additional information may be a histogram, like that shown in FIG. 4A. The information contained in this histogram has been obtained by the Oracle command VALIDATE INDEX. In response, Oracle creates a histogram table. On the basis of this histogram table and by means of a small program that is ordinary to one skilled in the art, a screen representing this histogram, like that shown in FIG. 4A, is formed.

Figure 4B:
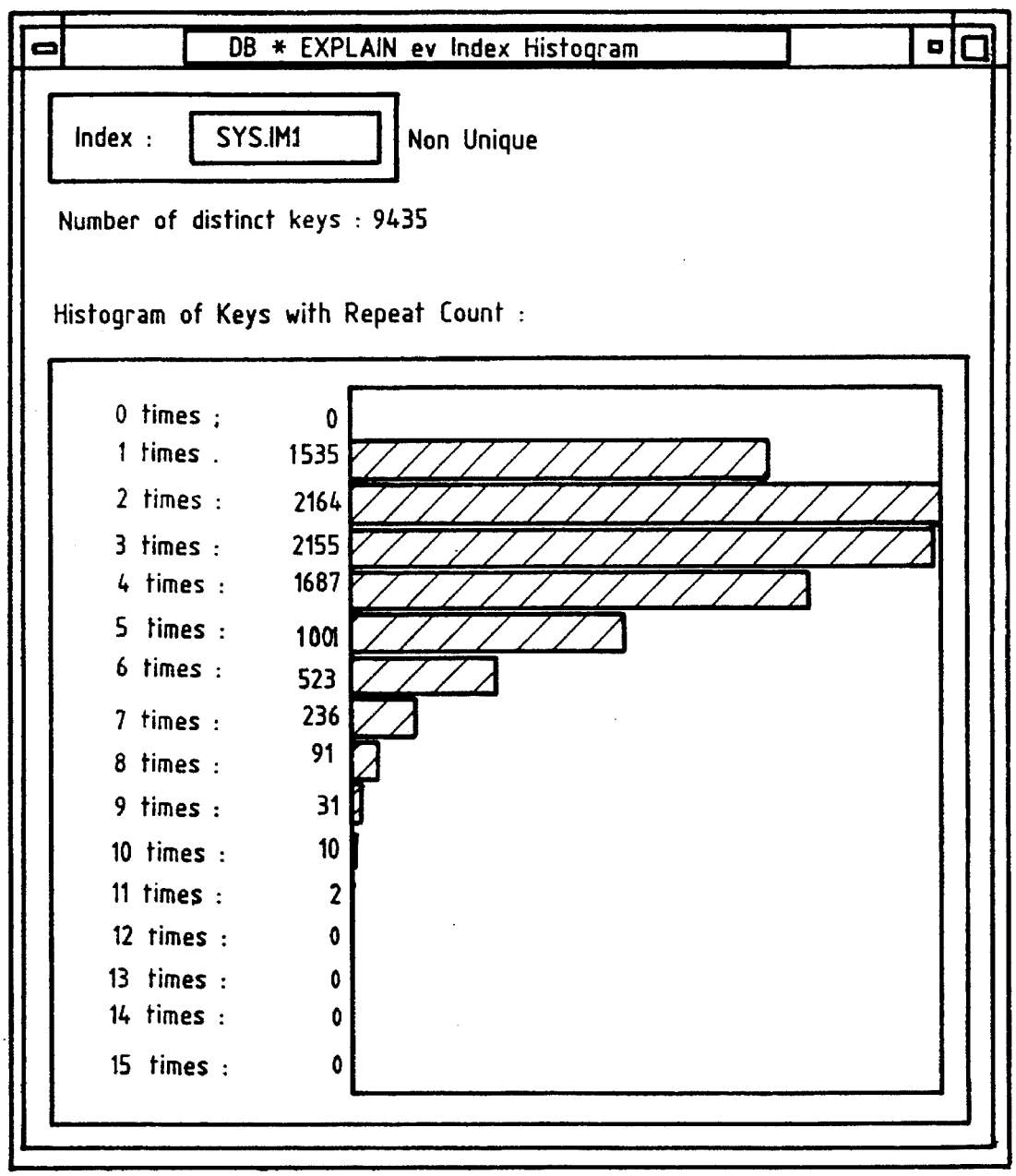
Figure 4C:
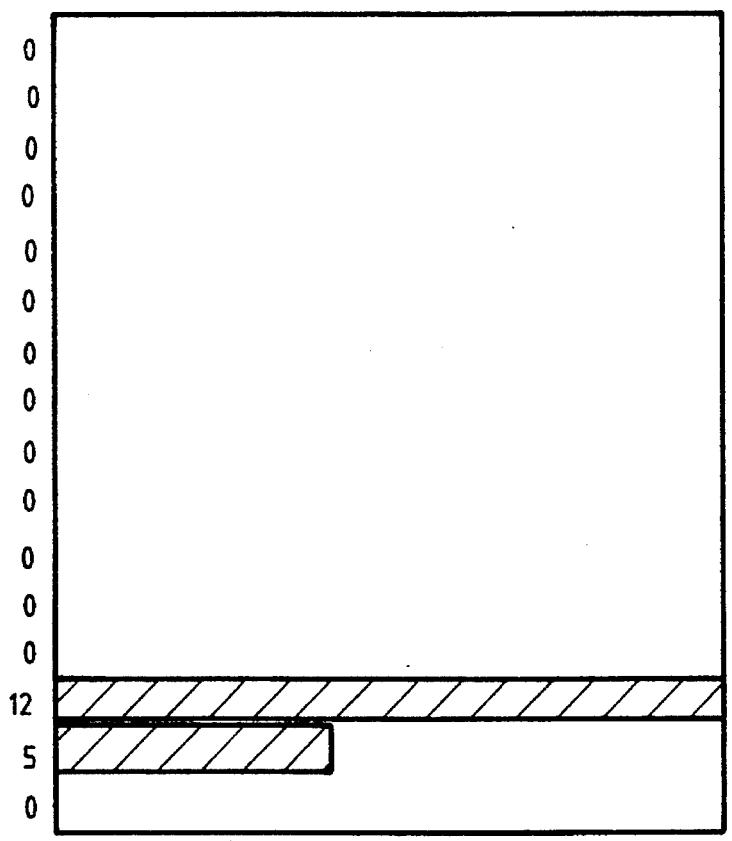

In the example shown in FIG. 4A, the user knows that his index includes 340 keys that are not repeated. The user immediately knows that the index chosen is very good. FIGS. 4B and 4C, respectively, show two other examples of histograms that may be obtained thanks to the invention. In the example of FIG. 4B, the user knows that the indexes used are less selective than before. FIG. 4C is a histogram representing a very unselective index which accordingly is to be changed. These examples highlight the advantages afforded by the method of the invention.

Another phase of the method for helping optimize a query consists of making a syntactical analysis of the query. The syntactical analysis may be done by various methods known to one skilled in the art. In the example that will be described now, the syntactical analysis according to the invention is determined in general by analysis of the function of the RDBMS, in order in particular to determine the types of nodes of the syntactical graph, and preferably to determine the information associated with these types.

Deep analysis of Oracle function makes it appear that execution of joins between tables and cartesian products is done without any order. It is possible to access a plurality of tables a plurality of times and to perform a plurality of operations for one SQL order. Sorts may be added or deleted. The projections and the tests are not marked. The only indicator that the RDBMS gives is the name of the tables and of the indexes accessed, and the order of citation of the tables in the FROM clauses of the source query. This is inadequate for full comprehension of a plan of execution that may contain several hundred nodes. This inadequacy, when it appears for a given type of RDBMS, is overcome by the method of syntactical analysis according to the invention. In that case, the syntactical analysis includes the determination of the operations executed by the RDBMS and the order in which these operations are executed. This order has the advantage of establishing a rigorous relationship between the query and the execution plan. In the case of the present RDBMS selected by way of example, the deep analysis of its operation has caused the following order to appear:

| TABLE | GROUP | HAVING | UNION | ORDER, |
| --- | --- | --- | --- | --- | where
- TABLE, for a query, represents both the access to the tables of the FROM clause, the cartesian product between these tables and all the tests of the WHERE clause;
- GROUP represents the GROUP BY clause and the calculations of the groups;
- HAVING represents the HAVING clause;
- UNION represents the operations UNION, MINUS and INTERSECT; and
- ORDER represents the ORDER clause.

Oracle calculates the groups of a query and makes the GROUP BY operation when all the tables of the FROM clause have undergone a cartesian product and the restrictions of the WHERE clause. It executes the HAVING clause after having done the grouping operations at the same time as the projections. Next it performs the UNION operations, and then ORDER orders the furnishing of the final result. In accordance with another constraint, the UNION operations are executed in the order cited in the query.

Figure 5A:
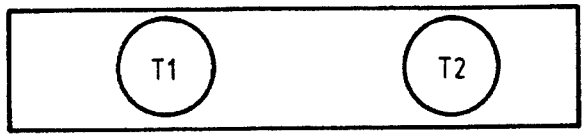
FIGS. 5A–5N illustrate criteria for the syntactical analysis of the query employed by the method of the invention.
Figure 5B:
Figure 5C:
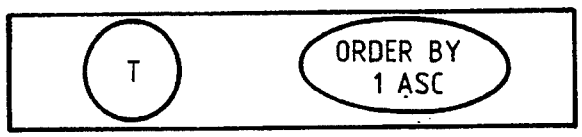
Figure 5D:
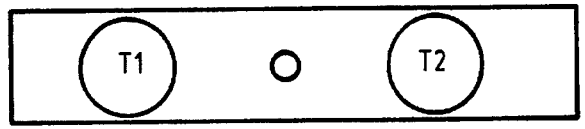
Figure 5E:
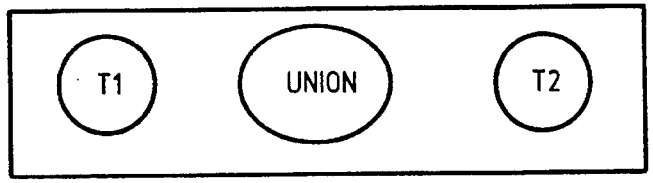
Figure 5F:
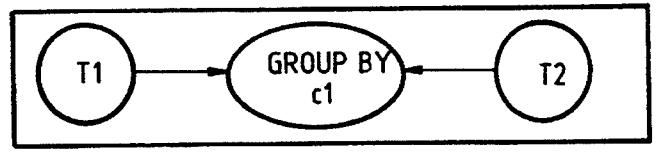
Figure 5K:
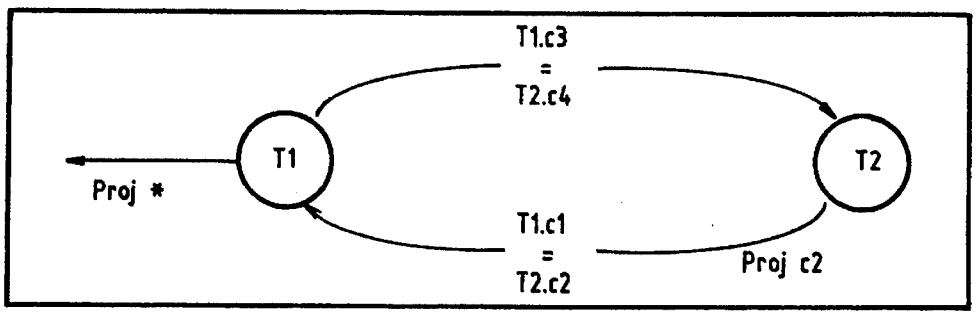
Figure 5L:
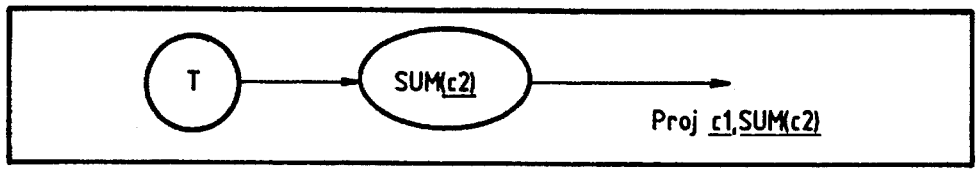
Figure 5M:
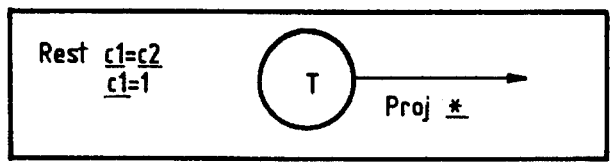
Figure 5N:
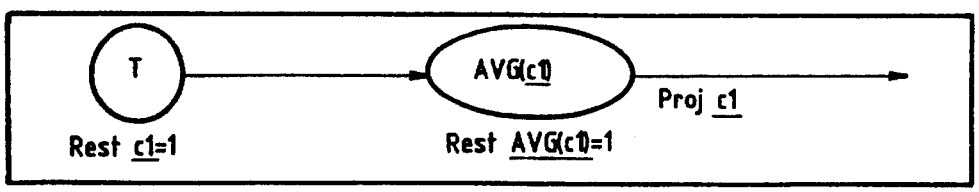

FIGS. 5A–5N by way of example illustrate conditions for determining the types of nodes of the syntactical graph based on the order relationship resulting from the deep analysis of the function of the RDBMS chosen. They also provide some examples of information that may be obtained from the deep analysis of the RDBMS function.

By a conventional definition, a node represents a real or virtual table. In the example chosen, one can create a node:

by table cited (FIG. 5A);

for the grouping operations. These operations are placed in the nodes and are the groups of GROUP BY, UNIQUE (FIG. 5B);

for the ORDER BY operation (FIG. 5C);

by the FROM clauses, which may possess a plurality of tables. In this case, the real outgoing flow is the result of the cartesian product of these tables. The cartesian product is not an explicit operation in the syntactical graph and is shown here by the arrival of a plurality of flow arrows at the same node. However, if there are no grouping operations, then an empty node must be created (FIG. 5D);

by a merging operation UNION, MINUS and INTERSECT. The type of operation is indicated (FIG. 5E).

With respect to the oriented arcs:

an oriented, nonlabeled arc represents the direction of the real flow of tuples (FIG. 5F);

an oriented arc labeled by a test represents the direction of the logical flow of the tuples. In other words, for each tuple of the starting table, the set of tuples of the destination table that meets the condition is selected. The condition hence influences only the destination table of the flow (FIG. 5G).

The result of the request is represented by a flow arrow without a destination node, leaving from the node that executed the last operation of the query (FIG. 5H).

With respect to the projections:

the projections of the SELECT clause are written close to the node from which the real flow leaves. If there is only one table in the FROM clause and no grouping operation, then the projections are marked under the node of the table (FIG. 5I);

the projections are written under an empty node resulting from a cartesian product, or under a node created by grouping operations (FIG. 5J);

the projections are written close to the arrow (flux or condition arrow) resulting from the projection (FIG. 5K).

Figure 6:
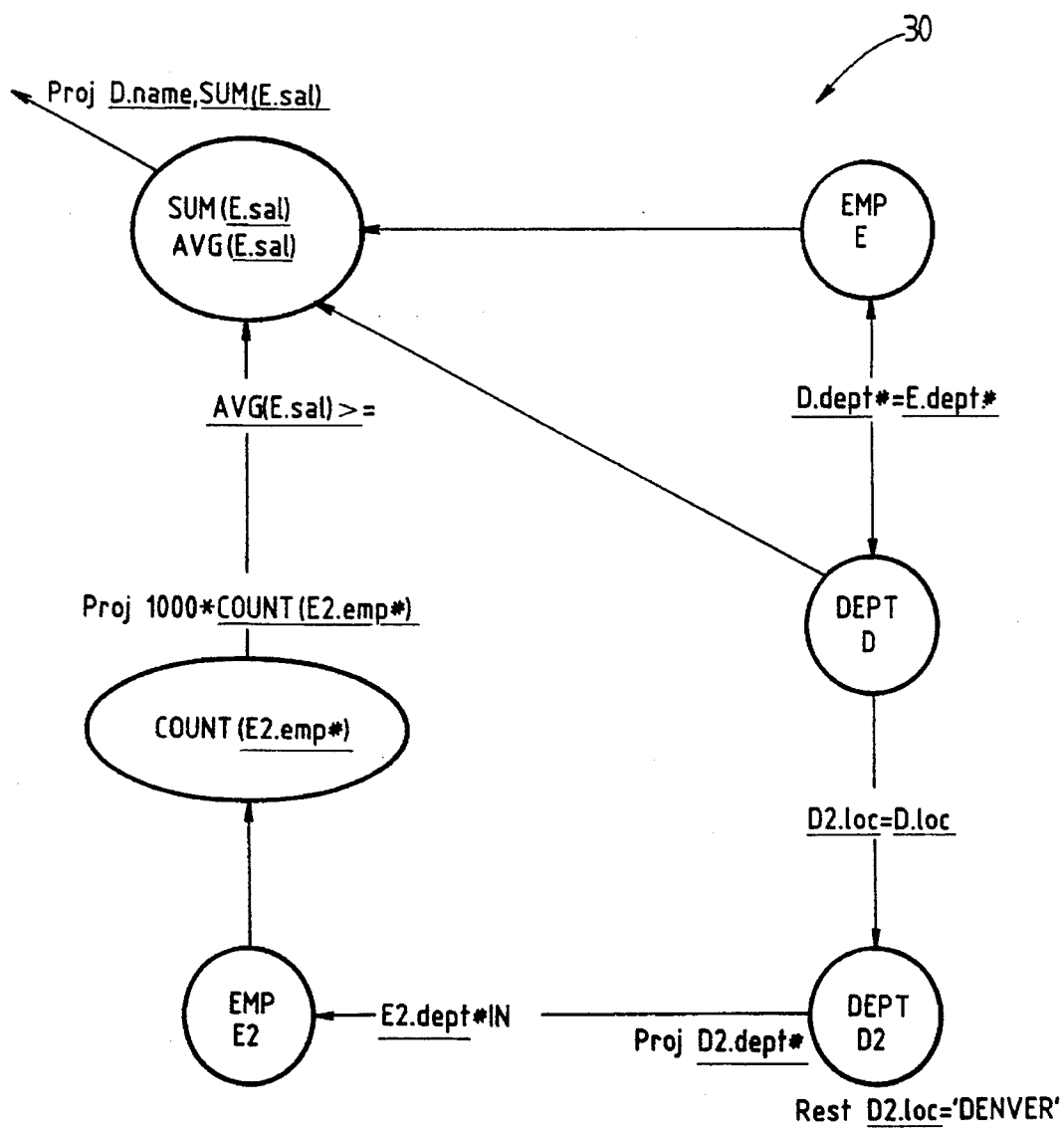
FIG. 6 shows a graph resulting from the syntactical query analysis done in accordance with the analysis criteria defined in FIGS. 5A–5N.

In the operations of the nodes, the projections and the condition labels, the operands originating from the entering flow are underlined (FIG. 5L). When a condition of the WHERE (or HAVING) clause includes only elements of this table and constants, then the conditions are marked under the node (FIG. 5M). Finally, the tests of a WHERE clause affect the nodes containing the name of the tables, and the tests of a HAVING clause affect the node containing the grouping operations (FIG. 5N). FIG. 6 illustrates an example of a graph 30 representing the syntactical analysis done in accordance with the criteria that have just be defined. This graph appears in the form of a network, which is the name by which this graph will henceforth be called.

Now that the tree 26 of the execution plan (FIG. 3) and the network 30 of the syntactical analysis of the query (FIG. 6) have been obtained, the final step of the method of the invention consists of comparing them, to supplement the tree 26 with elements contained only in the network. In the example shown, the comparison of the tree with the network has been done in three phases: associating the nodes of the tree with the nodes of the network; placing the projections; and placing the tests.

Figure 7:
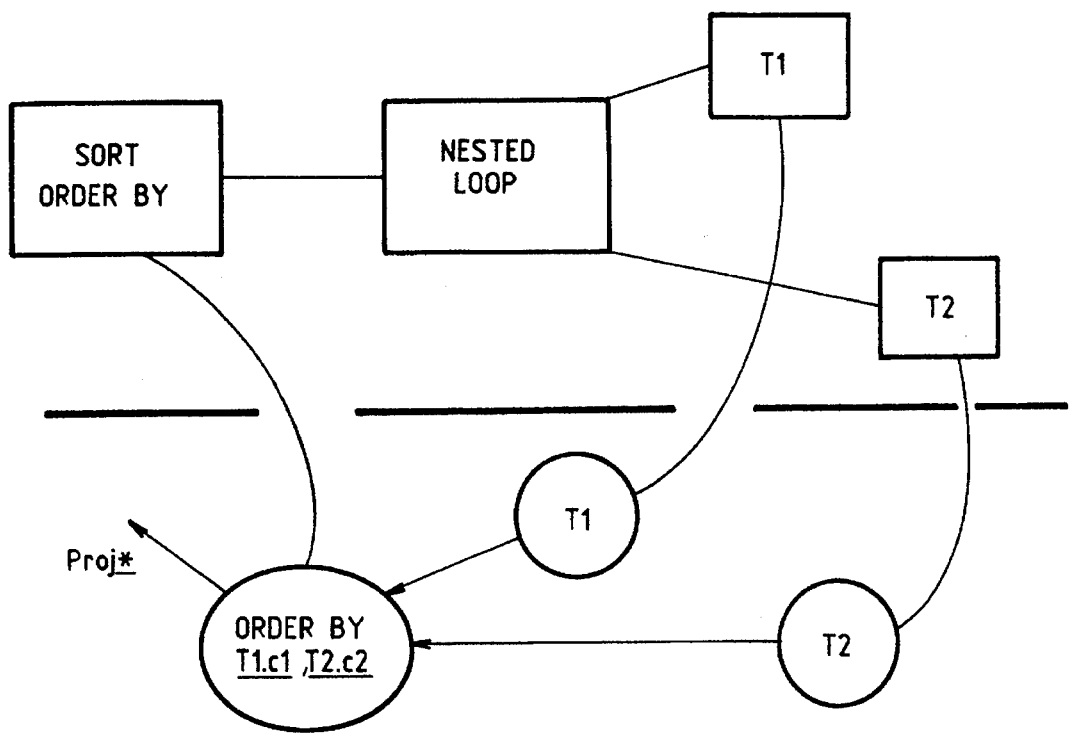
FIG. 7 illustrates an association of nodes that can be provided between an execution tree for a query and a graph for analysis of the query.

For example, to associate the nodes of the network with those of the execution plan, the operations of the DB*EXPLAIN tool, which are those of the RDBMS, have been classified into two groups depending on whether they are predictable or unpredictable. The predictable operations are those that ensue in the same order in the tree and in the network. It has been seen that the network is made up of only operations of this first group (TABLE, GROUP, UNION and ORDER node). The INDEX, TABLE ACCESS, UNION, MINUS, INTERSECT, SORT GROUP BY and SORT ORDER operations are also found in this group. FIG. 7 shows an exemplary association of predictable nodes of a network and of a tree. The operations constituting the second group are unpredictable when the order in which they appear in the query has not been preserved because a plurality of algorithms are possible each time. These are in particular the join operations NESTED LOOPS, FILTER and MERGE JOIN. The joins in the network appear in FIG. 11 as the links between the associated nodes. In general, the links between the associated predictable nodes are constituted with the unpredictable nodes.

Figure 8:
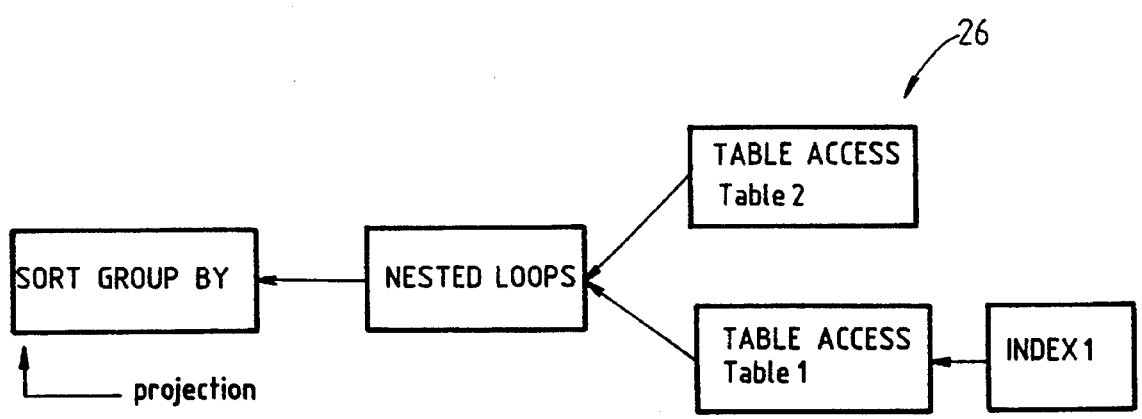
FIG. 8 illustrates a placement of projections for the association of the tree with the graph.

The placement of the projections consists of placing the projections on the proper nodes of the tree. A SELECT clause is not executable unless all the tables of the FROM clause are accessed, all the tests of the WHERE clause are executed, the groups are calculated, and the GROUP BY and HAVING clauses have been executed. In the network, the projections are done on the GROUP node, except if there is no cartesian product, group, or GROUP BY clause, or if the ORDER BY clause is added to the GROUP BY clause. Hence in the example of the tree 26 shown in FIG. 8 and representing the execution plan of the query shown in the margin of this drawing figure, the projection is done at the end of the SORT GROUP BY operation.

Figure 9A:
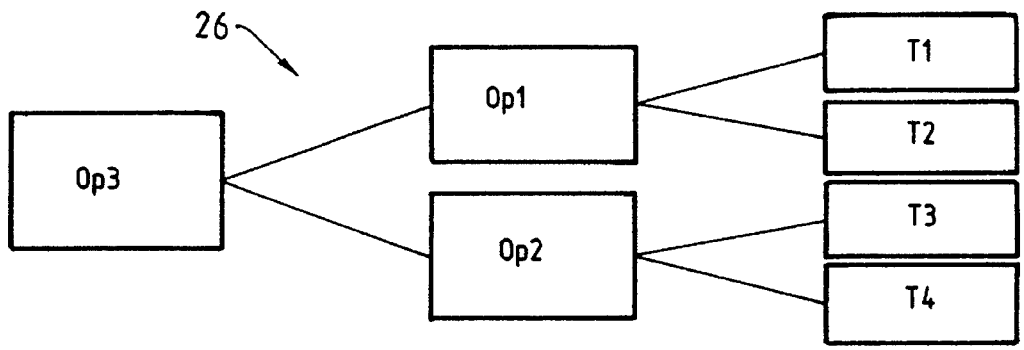
Figure 9B:
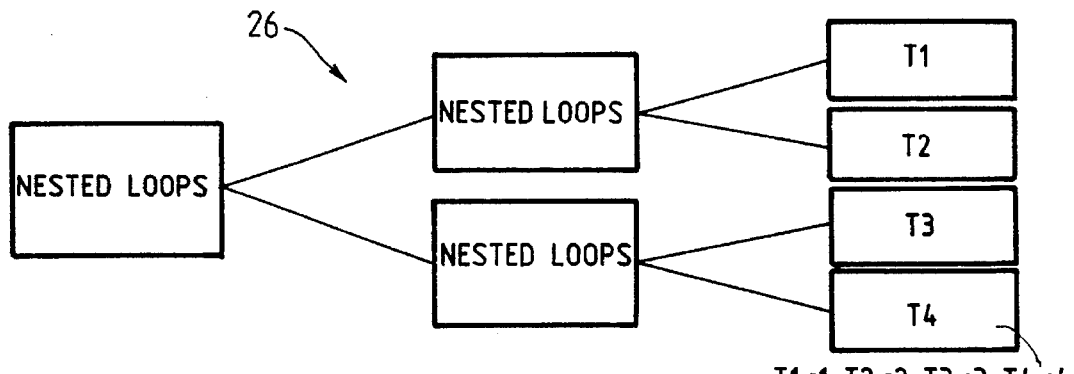
Figure 9C:
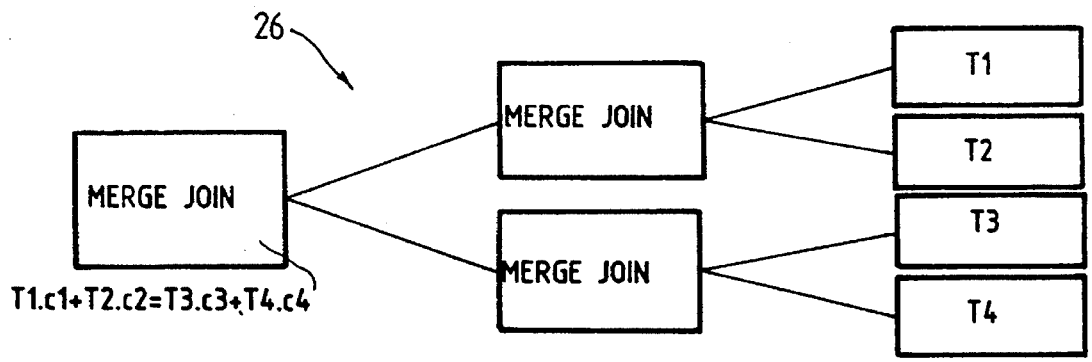

The placement of the tests consists of placing the tests on the proper nodes of the tree. Several examples will illustrate this phase of associating the tree with the network. In a first example, it has been assumed that the tree 26 had the form illustrated in FIG. 9A and that the join between T1, T2, T3 and T4 was such that T1.c1+T2.c2=T3.c3+T4.c4. In this example, the remainder of the query does not matter. The location of the test depends on the algorithm used. In the first case illustrated in FIG. 9B, Op1, Op2 and Op3 represent a NESTED LOOPS operation, which has already been defined as a parametrized operation. The tuples brought back by the first son have passed to the second son. The test is then performed in sheet T4, as illustrated. In the second case illustrated in FIG. 9C, Op2, Op2 and Op3 represent a MERGE JOIN operation, which is a merging operation that does not require passage of parameters. The test is done in the MERGE JOIN Op3 node through which the flows of the four tables pass, as illustrated. It may be noted that the algorithm of Op1 has no influence on the location of the test. In the third and last case shown in FIG. 9D, Op2 is a MERGE JOIN operation, and Op3 is a NESTED LOOPS operation. The tuples of operation Op1 pass in parameter form into the lower branch of the operation Op3. Consequently, it is the MERGE JOIN operation, Op2, that performs the test.

The second example relates to the SELECT nested clauses. Let it be assumed that the nesting . . . T1.c1 IN (SELECT T2.c2 . . . ) is as shown in the tree 26 of FIG. 10A. When the test is a nesting operation, the algorithm, is the FILTER clause. In that case, the IN test requires the prior execution of all the nested SELECT clauses. The test is accordingly done in FILTER. It is concluded by the fact that T1.c1 must have a value equal to a value originating in the second branch and translates as "IN flow of the second branch", as illustrated in FIG. 10B If the algorithm is NESTED LOOPS or MERGE JOIN, the RDBMS converts the nesting into normal joining in the presence of an IN or EXISTS test possessing a join between a nested SELECT clause and a non-nested SELECT clause. For example, if SELECT *
FROM T1
WHERE Exists
 (Select *
 FROM T2
 WHERE T1.c1 - T2.c2)

then the RDBMS converts the IN or EXIST test into a join by modifying the projection:

SELECT unique T1.*
FROM T1, T2
WHERE T1.c1=T2.c2.

Exemplary embodiments of the method of the invention will now be illustrated. These examples are based on a file written in C language to function in a Unix configuration. The file given by way of example is the file named struct.h appended to the end of the present specification and forming part of the specification. This file provides the definitions of all the structures specific to the network and presents itself in the following manner.

In accordance with the C language, all the objects of the file are characterized by the same class, specified by the key word typedef specific to the construction of a new type. The type thus defined may then be used as a basic type. The file is divided into two parts relating to the two types composed, which are the enumerations and the structures of the C language. An enumeration defines a type by extension and declares itself with the help of the key word enum. The structures declare themselves with the help of the key word struct. It will also be recalled that the integral type is declared with the key word int, the character type by char, and the floating type by float. The qualifier const specifies that the object to which it is applied is a constant object which is not modifiable by the execution of the program. Comments are delimited by the sequences /* and /*.

The first enumeration done in the file named struct.h has the name TYPE_COL and defines the various types of columns that can be used in a table of the data base and by the structure s_Field. The next enumeration, designated by TYPE_CONST, defines the types of constants used in the structure s_CONST. The enumeration TYPE_EXPLAIN defines the types of operation of the RDBMS that have been summarized by the tool DB*EXPLAIN and that are used in the structure s_Node. The enumeration TYPE_EXPL_OPT defines the types of operations relating to the operations enumerated in the preceding enumeration. These options are used in the s-Node structure. Certain operations of the sorting operation SORT have been defined above by example. The enumeration TYPE_NODE defines the types of nodes of the network that are used in the structure s_Node. The enumeration TYPE_OPER defines the types of operation of the SQL language used in the arithmetical expressions and in the structure s_Oper. The other enumerations relate successively to: the modes of the ORDER clause (TYPE_ORDER) that are used in the structure s_Order_Col; the operations on queries (TYPE_QUERYOP); the modes that relate to the SELECT command (TYPE_SELECT) and are used by the s_Node, s_Oper and s_SELECT structures; the types of each of the structures (TYPE_STRUCT); the test types in a predicate (TYPE_TEST) that are used in the s_Test structure; the options (TYPE_TESTOPT) of the tests of the SQL language that are used in the s_Test and s_Set structures; and the lists of tests in a node structure (TEST_LIST). These enumerations are supplemented with the individual definitions indicated in the following lines.

The second part of the struct.h file describes the various structures that are used. The description that follows furnishes additional comments to those of the file. The first field of each of the structures is defined in the enumeration TYPE_STRUCT.

The s_Node structure is representative of a node of the tree that is to be supplemented with the elements of the network. The structure described in the file is an improved version of the structure mentioned above that was sufficient to construct the tree 26. The type of node may be a TABLE, a GROUP, an ORDER or an EXPLAIN or QUERY operation. The list named input_nodes is the list of son nodes whose data flow enters into a node of the tree. The next field defines as an output node the one where the output flow from the node goes. The lists named input_tests and output_tests relate respectively to the input join tests, which are those influencing the result, and the output join tests, which are those using the values of the aforementioned output flow without influencing the result. The internal tests of the next list concern only that node. The information info indicates the structure of a node. For a table node, one points to an s_Table; for a group node, one points to an s_Group structure; for an order node, one points to an s_Order structure; and a union node corresponds to a TYPE_QUERYOP operation. The fields list is the list of all the pointers at the fields or projection operations. It represents the structure of the output flow from the node after the projection. The pointers of the list do not mark specific structures of that list. They mark either the s_Field structures of the fields list of the s_Table structure, if there is no further projection, or the structures of the proj list of the present structure. Depending on the last field nested, in the case of a node representing a semi-join between a normal SELECT and a NESTED select, it is necessary to know which of the two daughter branches of the node represents the nested SELECT.

The s_Oper structure well describes an arithmetical operation or a function call.

The s_Column structure is used for the syntactical analysis of a column. A column is what separates the commas in the SELECT (projection columns), GROUP BY (grouping columns), and ORDER BY (sorting column) clauses, and is found to the right and left of a non-nested test. For example, avg(table.field)+table.price * 1000 is a single column. A column is the root of a tree of s_Oper, s_Field, s_Const and s_Set structures.

In the s_Column structure, oper is a root operation. It may also involve a field or a constant. The funct list is that of the groups contained in the column. It has no structures of its own. This is a list of pointers to the s_Oper structures contained in the tree, whose root is s_Column. Finally, the fields list is that of the fields contained in the column. It too has no structures of its own.

The s_Const and s_Field structures are well described.

In the s_From structure brought back by the syntactical analysis of the FROM clause, the tables list is the list of the table nodes that result from the syntactical analysis. There is one node per table cited.

In the s_Group structure, the funct list is the list of the groups to be calculated. This list does not have its own structures. It is a list of pointers to the s_Oper structures that are present in the following lists of the following structures:

the fields list of the s__Group (the groups of the GROUP BY clause), the proj list of the s__Node (the groups of the SELECT clause), and the test lists of s__Node, if it is a grouping node (the groups of the HAVING clause).

The s__Having, s__Order and s__Order__Col are well described.

The s__Select structure is brought back by the syntactical analysis of the SELECT clause. In the proj list of projection operations, each column in the projection corresponds to one element in the list. The funct list of the groups present in the projection does not have any structures of its own. They point to the s__Oper structures present in the preceding list. Similarly, the fields list of the fields of the projection does not point to its own structures.

The structure s__Set is well defined in the file. It makes it possible to memorize a list of values.

In the s__Table structure, the object EXPLAIN gives the number of the EXPLAIN node of the execution tree.

In the s__Test structure representing a test, the fields list of the fields of the table or index does not have its own structures. These are those present in the tree of operands constituting the test.

The s__Where structure is brought back by the syntactical analysis of the WHERE clause. The nodes list is the list of total nodes created by the syntactical analysis of the nested SELECT clauses. The tests list combines the tests of the HAVING clause and the tests created by the syntactical analysis of the nested SELECT clauses. Finally, since for the syntactical analysis a s__Where structure may be used at the same time as a syntactical analysis of the HAVING clause, the funct list contains the groups present in the tests. This list does not point to its own structures.

The final structure, s__Connect, is brought back by the syntactical analysis of the CONNECT privilege of the SQL.

The first illustration of the use of the struct.h file relates to the example of a query cited in the introduction:

SELECT Type
FROM Type__Car
WHERE Mark='XXX'

In that case, the s__Select structure would be used for the construction of the tree, like that described above. For the syntactical analysis of the query, the model name XXX is found in s__Const, which would contain value='XXX' and type=CONST__STRING with the enumeration TYPE__CONST. The s__Set structure may be nested, if Mark is to be chosen between XXX, YYY and ZZZ. On the other hand, in the query, the term Mark in WHERE corresponds to the s__Field structure. In s__Field, table__name=Type__Car, name=Mark, and type would be the type of the column defined by COL__STRING in the enumeration TYPE__COL. In the query, WHERE Mark ='XXX' refers to s__Test and s__Where. In s__Test, the type of test defined in TYPE__TEST would be TEST__EQ, signifying that the test consists of an equality. Otherwise, in the case of nonequality, for example, the NOT option would be chosen. The first operand would be Mark corresponding to s__Field, and the second operand would be the constant XXX determined in s__Const, as has been seen above. The list of test fields would include only Mark, but could also include Price, for example. In s__Where, the test will be chosen from the list of possible tests that are contained in the WHERE clause. Similarly, in the nodes list, the table containing Mark will be chosen. The structures relating to the clauses CONNECT, FROM and HAVING are not used in the example in question. However, the previous example and the struct.h file will suffice for one skilled in the art to use them correctly without ambiguity or problems. Finally, one points to s__Global to obtain the final graph. "Term" designates the terminal node of the final graph, that is, the box at the top of the graph at which all the other nodes begin that are found in the nodes list resulting from the tests contained in the query, that is, the test of the WHERE clause in the query that has been used as an example.

The representation of the network with the data structures that have just been described will now be done with the aid of the illustrative example of the next query, which is also reproduced in FIG. 11:

SELECT type avg (Price)
FROM TYPE, MARK
WHERE TYPE.mark=MARK.mark
HAVING avg (Price)>1000

In accordance with the above teaching, the resultant network 31 has the form illustrated in FIG. 11. To more clearly represent the network with the data structures, the various fields of the structures are shown in the various FIGS. 12A–12H. By convention, the arrows in these figures represent pointers. A pointer is the field that is located at the beginning of the arrow. When the pointer is a list, each object on the list is connected to the next by an arrow. The order of the arrows represents the order of the list.

Figure 12A:
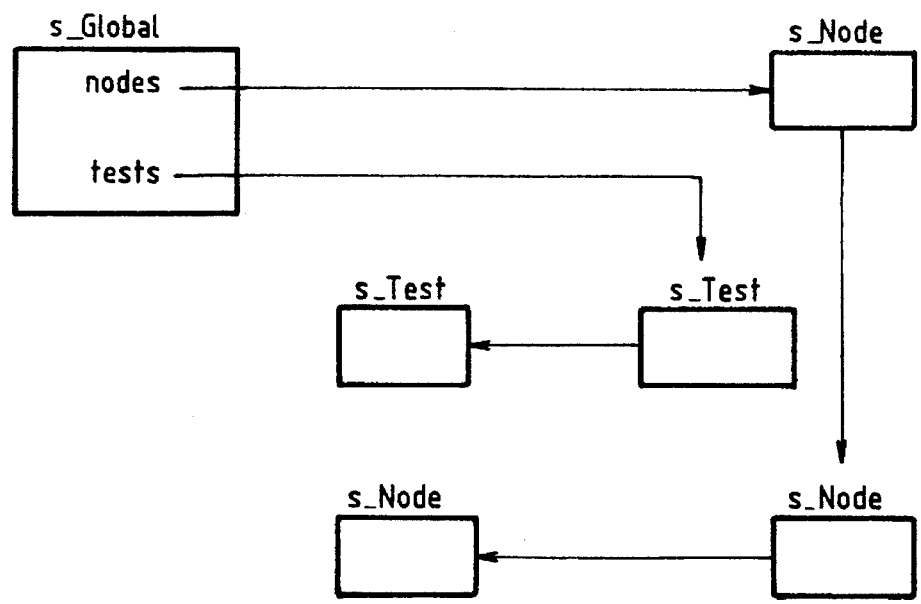

FIG. 12A shows the fields marking all the nodes and all the tests of the network. In the s__Global structure, the nodes list points successively to all the three s__Node structures representing the three nodes of the network, while the tests list points successively to the two s__Test structures representing two tests involved in the network, that is, the test of relative superiority to the first node, and the test of equality between the other two nodes.

Figure 12B:
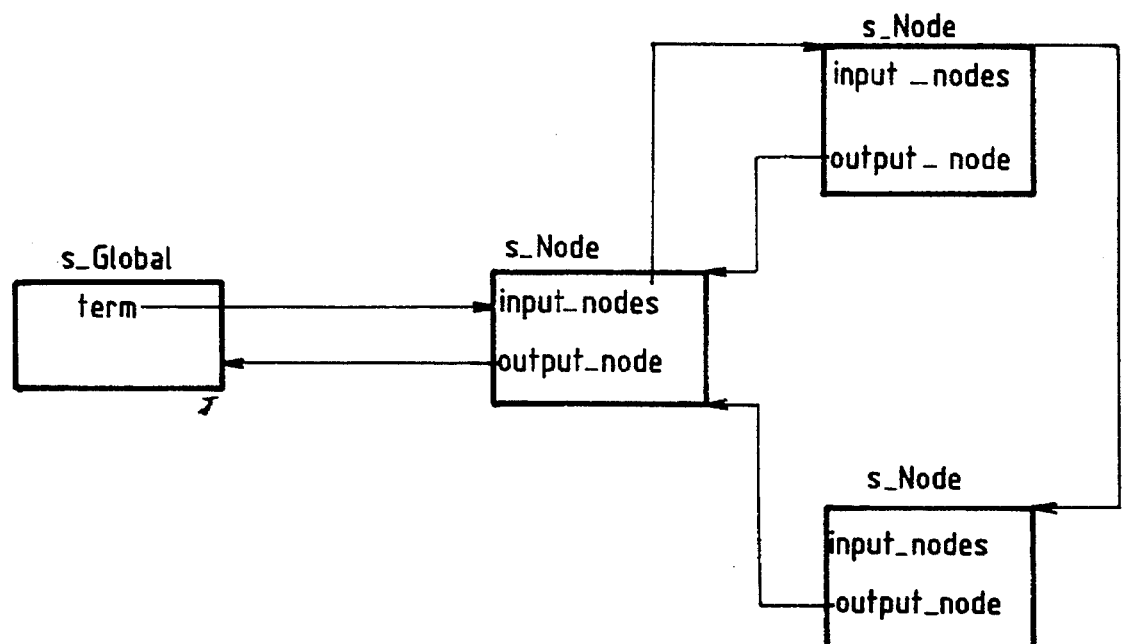

FIG. 12B illustrates the fields that mark the direction of flow. In the s__Global structure, the "term" node representing the terminal node from which the result originates points to the s__Node structure representing the terminal node. In s__Node, the list of input nodes, which is named input__nodes, points to the other two structures s__Node. The output nodes, named output__node, of these two structures point to the s__Node structure of the terminal node, in which the output node points to s__Global.

Figure 12C:
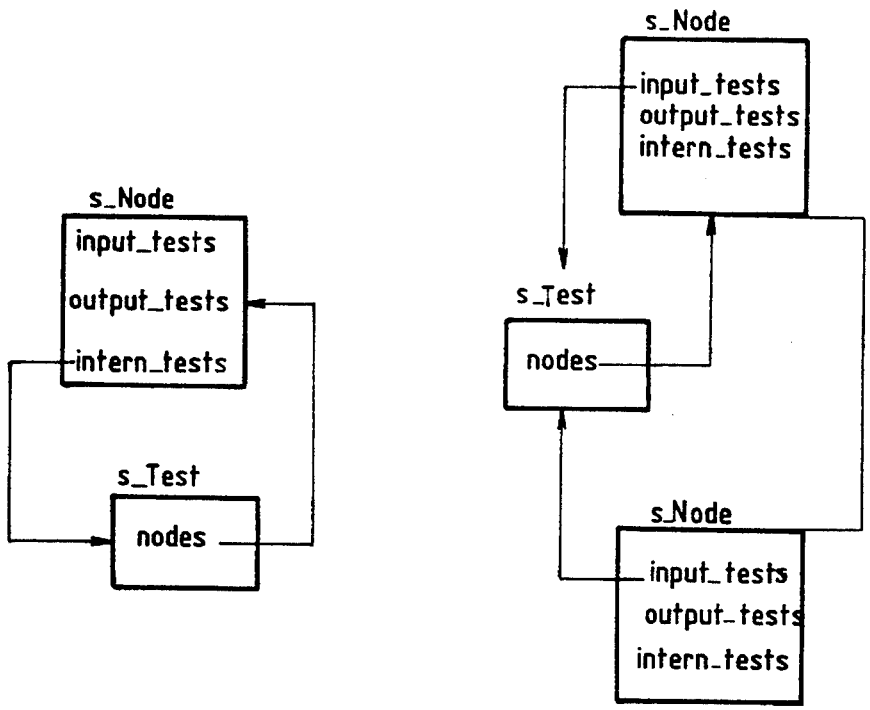

FIG. 12C illustrates the field describing the links between tests and nodes. The test of superiority relates only to the terminal node and hence constitutes an internal test. Consequently, the list of internal tests, named intern__tests, of the s__Node structure of the terminal node points to the s__Test structure, in which the nodes list, i.e., the list of nodes that have a field in the test, points to the structure s__Node. The test of equality relates to the other two nodes. Consequently, the input__tests list of the s__Node structures of these two nodes point of the s__Test, in which the nodes list points to the two s__Node structures.

Figure 12D:
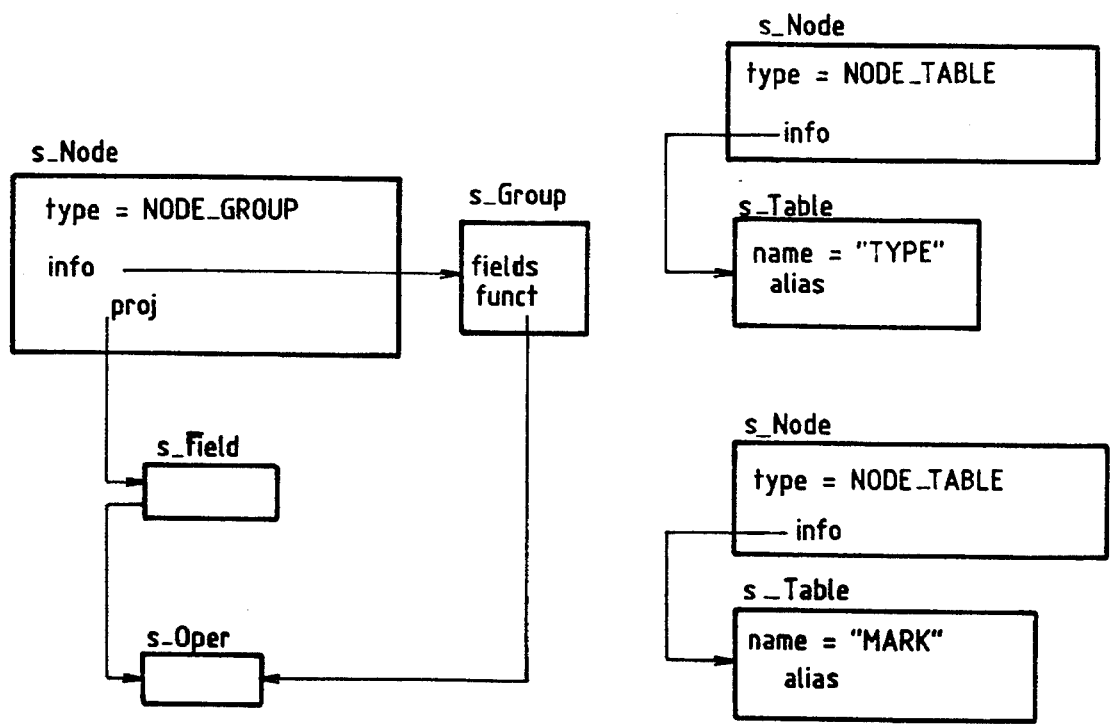

FIG. 12D relates to the type of nodes. The terminal node is a grouping node and causes a projection to take place. The type of node in s__Node is accordingly NODE__GROUP representing a GROUP BY clause, and the info field indicating the structure of the node points to the grouping structure s__Group, in which the "funct" list of groups to be calculated points to the calculation s__Oper structure. On the other hand, the proj list of projections of the s__Node structure points to the field structure s__Field, which points to s__Oper in the manner described in detail in conjunction with FIG. 12E. The other two nodes relate to tables and accordingly have the type NODE__TABLE, and their info field, which indicates the structure of the node, clearly points to the corresponding table TYPE and MARK.

Figure 12E:
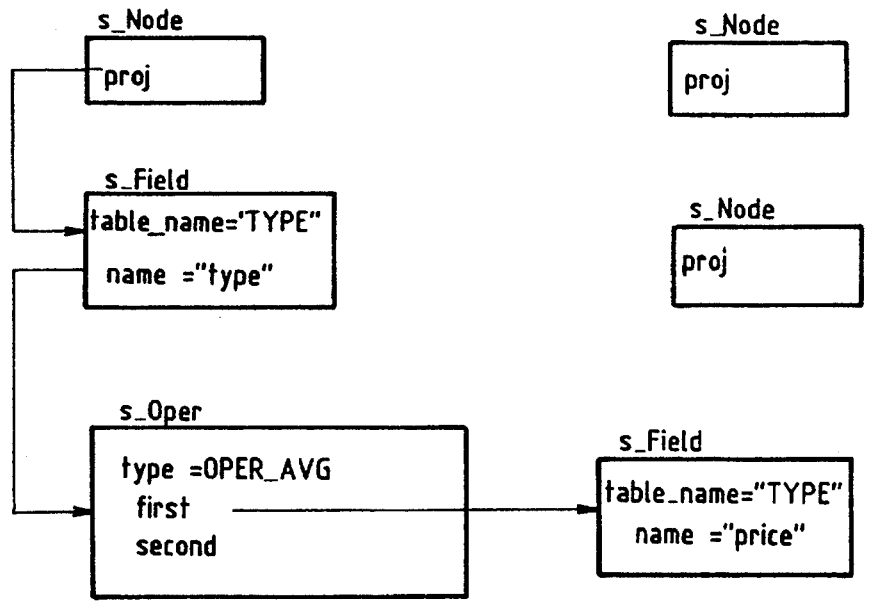

FIG. 12E relates to the projections. The example shown in FIG. 11 causes two projections relating to the terminal node to take place. In the corresponding s_Node structure, the list of projections proj points first to the field s_Field structure, in which the name of the table, table_name="TYPE", and the name of the object is name=type. Next it points to the calculation structure s_Oper, whose type is AVG (type=OPER_AVG), and whose first operand, named "first", points to the s_Field structure, in which table_name="TYPE", and the object name is name="price".

Figure 12F:
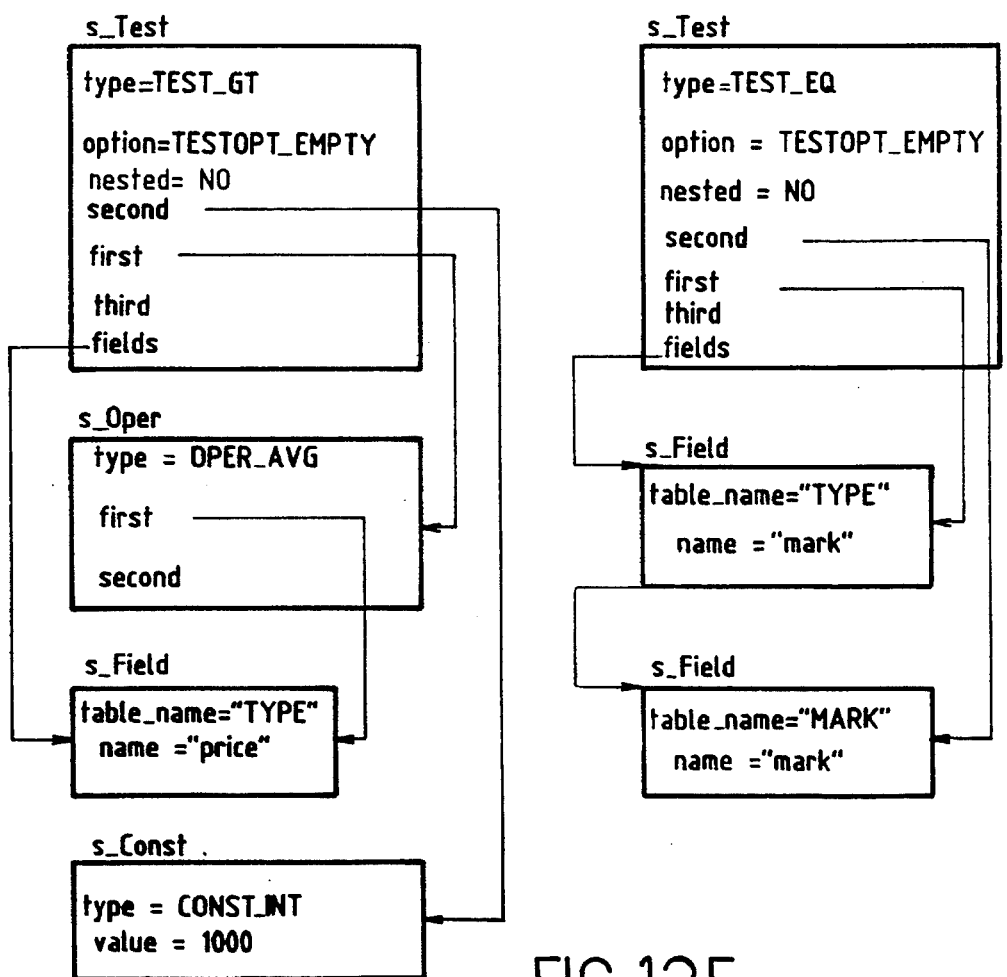

Finally, FIG. 12F relates to the tests. The example shown brings about two types of test, the test of superiority (>), and the test of equality (=). For the test of superiority, in the corresponding s_Test test structure, type=TEST_GT, without option (option=TESTOPT_EMPTY) and without nesting (nested=NO). In a similar way to that shown in FIG. 12E, the first operand points to the structure s_Oper, whose operation type is AVG and whose first operand points to the s_Field structure, in which table_name="TYPE" and the object name is name="price", this structure having been designated by the fields list of the corresponding test structure, s_Test. The second operand is the constant 1000 furnished by the s_Const structure, in which the type is an integral number (type=CONST_INT) and the value is 1000 (value=1000). For the test of equality, one refers to the test structure s_Test, where type=TEST_EQ, without option and without nesting. The fields list points to the s_Field structure representing the table where table_name="TYPE" and the object name is name="mark", and then to the s_Field structure representing the table where table_name="MARK" and the object is "mark". These two structures respectively constitute the first operand, first, and the second operand, second, of the test to be performed.

Thanks to the network 31 of FIG. 11, one knows that projections on [or about] TYPE and AVG (price) and the restriction rest AVG (price)>1000 exist in the node terminal, and that the other two nodes are involved in the equality test (TYPE.mark)=MARK.mark. These elements of the query were incapable of appearing in the execution plan of the query, and advantageously, all or some of them can supplement the execution tree 26.

Figure 3:
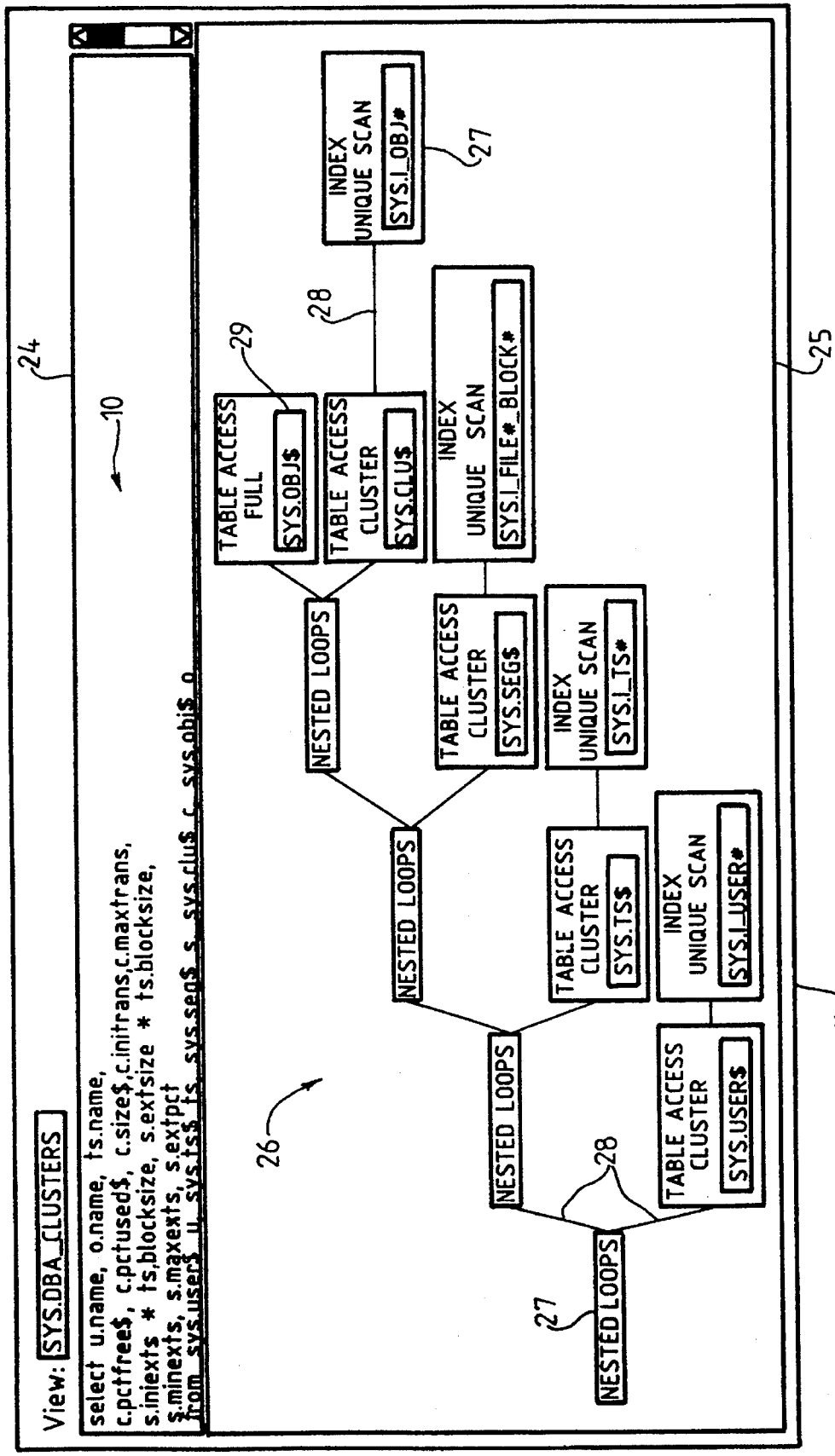
FIG. 3 illustrates an example of a tree for executing the query shown in FIG. 2C, obtained by employing the method of the invention to help in optimizing the query.
Figure 13:
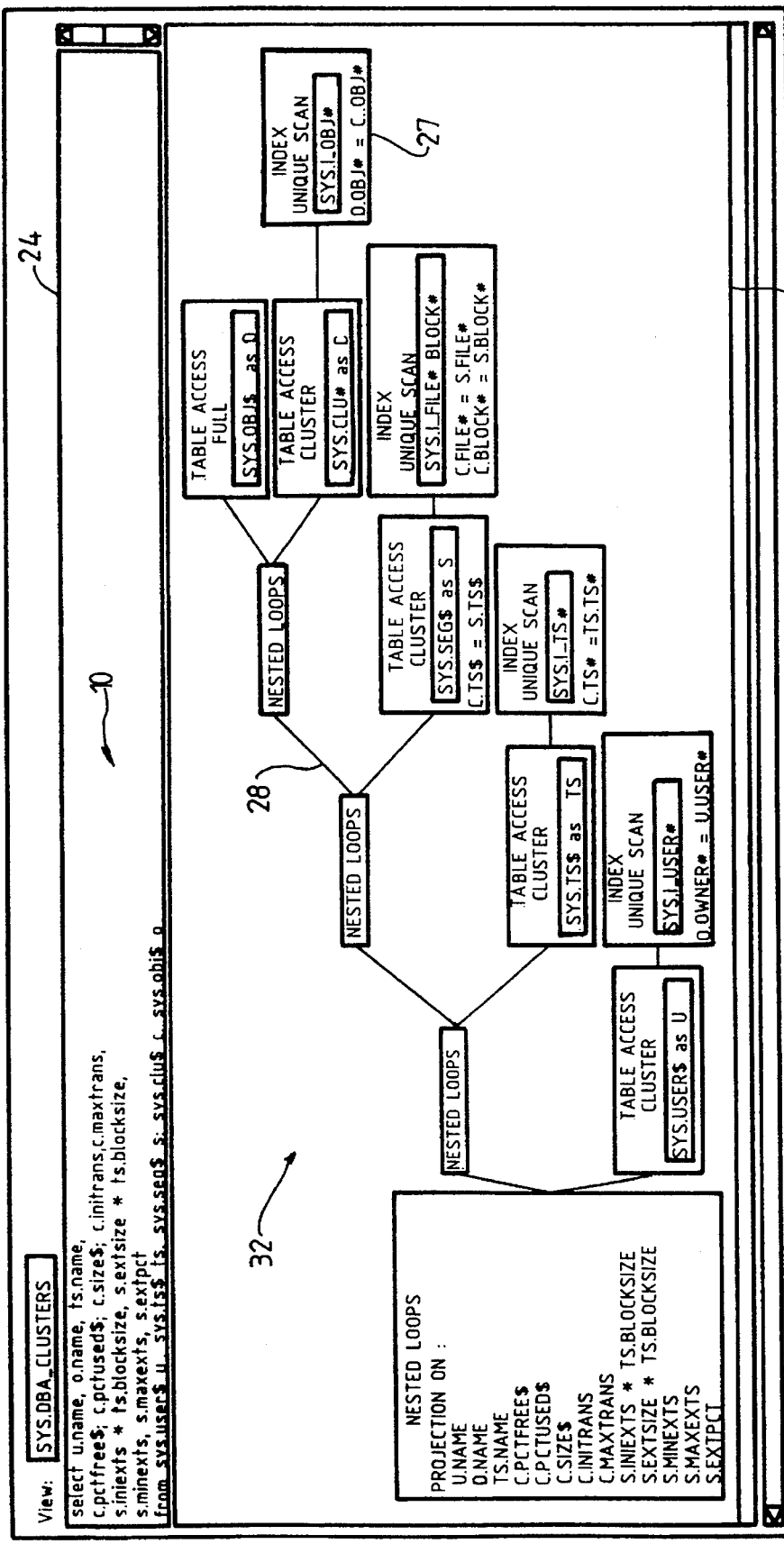
FIG. 13 shows a complete tree in accordance with the invention for the execution of a query.

FIG. 13 shows the complete tree 32 for execution of the query 10 shown in FIG. 2C resulting from employing the method of the invention. The complete tree will be compared with the tree 26 shown in FIG. 3 obtained simply by analysis of the execution plan of the table shown in FIG. 1. In the complete tree 32, the boxes 27 contain the descriptive elements of all the corresponding operations. Hence, beginning with the last box that appears on the right of the screen shown in FIG. 13, it can be seen that the operation INDEX, whose option is UNIQUE SCAN and whose object is SYS.I_OBJ# (as indicated in FIG. 3) corresponds to the second condition of the WHERE clause in the query 10. This box is connected to the one affecting the TABLE ACCESS operation, whose option is CLUSTER and whose object is SYS.CLU# (as indicated in FIG. 3), which in the query 10 has been given the synonym (alias) C. Similarly, one knows that in the upper box connected to the same operation NESTED LOOPS, the object SYS.OBJ# has the synonym O. Continuing, from the tree 26, one also knows the following:

with respect to the third and next-to-last NESTED LOOPS operation, that the object in (TABLE ACCESS) has the synonym S and is involved in the fourth test under the WHERE clause of the query, and that the daughter box bearing on INDEX is concerned with the last two tests of the WHERE clause of the query;

with respect to the second NESTED LOOPS operation, that the object SYS.TS# has the synonym TS and that the INDEX operation is involved in the third test mentioned under the WHERE clause of the query;

and finally, on the subject of the first NESTED LOOPS operation which appears in the lower left corner, that all the projections bearing on this operation are now known, that the object SYS.USERS# in the box has the synonym U, and that the index is subjected to the first test of the WHERE condition of the query.

This example is a good illustration of the fact that the complete tree 32 can provide a complete description of any query. It is understood that the analysis may be limited to certain elements, in order to make a more or less complete description. It is understood that further variants are possible to one skilled in the art, depending on the type of RDBMS and on its environment. In a general way, the steps of forming two graphs representing the tree and the network, respectively, may be done in any arbitrary order, and that comparison could be done differently from that described, which consists of associating the nodes of the tree with the nodes of the network and placing the projections and the tests. Similarly, the criteria for syntactical analysis and comparison may vary greatly. However, the criteria described optimize the method of the invention and constitute the preferred embodiment for the RDBMS selected as an illustrative example.

struct.h

```c
/* ================================================================
 *
 * file:        struct.h (header file)
 * language:    C (K&R)
 * description: this file contains the definitions of all the structures
 *
 * ================================================================
 */ typedef enum /* -- data type of table columns -- */
{
    COL_EMPTY=0,    /* if column is '*' or unknown type       */
    COL_DATE,       /* column is DATE                         */
    COL_INT,        /* column is NUMBER(x) or NUMBER(x,-y)    */
    COL_LONG,       /* column is LONG                         */
    COL_RAW,        /* column is RAW or LONGRAW               */
    COL_REAL,       /* column is NUMBER(x,y)                  */
    COL_ROWID,      /* column is ROWID                        */
    COL_SPECIAL,    /* column is a special function           */
    COL_STRING      /* column is CHAR or VARCHAR              */
}
    TYPE_COL;

typedef enum /* -- data type of constants -- */
{
    CONST_EMPTY=0,  /* initial TYPE_CONST (error later)       */
    CONST_INT,      /* constant is an integer  */
    CONST_NULL,     /* constant is NULL        */
    CONST_REAL,     /* constant is a real      */
    CONST_STRING    /* constant is a string    */
}
    TYPE_CONST;

typedef enum /* -- type of explain operations -- */
{
    EXPLAIN_EMPTY=0,      /* no operation has been specified */
    EXPLAIN_AND_EQUAL,    /* operation is AND_EQUAL       */
    EXPLAIN_CONNECT_BY,   /* operation is CONNECT BY      */
    EXPLAIN_CONCAT,       /* operation is CONCATENATION   */
    EXPLAIN_COUNT,        /* operation is COUNT           */
    EXPLAIN_FILTER,       /* operation is FILTER          */
    EXPLAIN_FIRST_ROW,    /* operation is FIRST ROW       */
    EXPLAIN_FOR_UPDATE,   /* operation is FOR UPDATE      */
    EXPLAIN_INDEX,        /* operation is INDEX           */
    EXPLAIN_INTER,        /* operation is INTERSECT       */
    EXPLAIN_MERGE_JOIN,   /* operation is MERGE JOIN      */
    EXPLAIN_MINUS,        /* operation is MINUS           */
    EXPLAIN_NESTED_LOOPS, /* operation is NESTED LOOPS    */
    EXPLAIN_PROJ,         /* operation is PROJECTION      */
    EXPLAIN_REMOTE,       /* operation is REMOTE          */
    EXPLAIN_SEQUENCE,     /* operation is SEQUENCE        */
    EXPLAIN_SORT,         /* operation is SORT            */
    EXPLAIN_TABLE_ACCESS, /* operation is TABLE ACCESS    */
    EXPLAIN_UNION,        /* operation is UNION           */
    EXPLAIN_VIEW          /* operation is VIEW            */
}
    TYPE_EXPLAIN;

typedef enum /* -- type of explain options -- */
{
    EXPL_OPT_EMPTY=0,      /* no option has been specified */
    EXPL_OPT_BY_ROW,       /* option is BY ROW          */
    EXPL_OPT_CLUSTER,      /* option is CLUSTER         */
    EXPL_OPT_FULL,         /* option is FULL            */
    EXPL_OPT_GROUP_BY,     /* option is GROUP BY        */
    EXPL_OPT_JOIN,         /* option is JOIN            */
    EXPL_OPT_ORDER_BY,     /* option is ORDER BY        */
    EXPL_OPT_OUTER,        /* option is OUTER           */
    EXPL_OPT_RANGE_SCAN,   /* option is RANGE SCAN      */
    EXPL_OPT_UNIQUE,       /* option is UNIQUE          */
    EXPL_OPT_UNIQUE_SCAN   /* option is UNIQUE SCAN     */
}
    TYPE_EXPL_OPT;
```

```c
typedef enum /* -- type of node in structure NODE -- */
{
    NODE_EMPTY=0,   /* initial TYPE_NODE (error later)        */
    NODE_CONNECT,   /* node is a CONNECT BY clause            */
    NODE_EXPLAIN,   /* node is an explain node                */
    NODE_GROUP,     /* node is a GROUP BY clause              */
    NODE_ORDER,     /* node is an ORDER BY clause             */
    NODE_QUERYOP,   /* node is a query operation, e.g. UNION  */
    NODE_TABLE      /* node is a table                        */
}
    TYPE_NODE;

typedef enum /* -- operations used in arithmetic expressions -- */
{
    OPER_EMPTY=0,         /* initial TYPE_OPER (error later) */
    OPER_ABS,             /* operation is ABS                */
    OPER_ADD,             /* operation is add: +             */
    OPER_ADD_MONTHS,      /* operation is ADD_MONTHS         */
    OPER_ASCII,           /* operation is ASCII              */
    OPER_AVG,             /* operation is AVG                */
    OPER_CEIL,            /* operation is CEIL               */
    OPER_CHARTOROWID,     /* operation is CHARTOROWID        */
    OPER_CHR,             /* operation is CHR                */
    OPER_CONCAT,          /* operation is concatenation : || */
    OPER_CONVERT,         /* operation is CONVERT            */
    OPER_COUNT,           /* operation is COUNT              */
    OPER_DECODE,          /* operation is DECODE             */
    OPER_DIV,             /* operation is divide: /          */
    OPER_DUMP,            /* operation is DUMP               */
    OPER_FLOOR,           /* operation is FLOOR              */
    OPER_GREATEST,        /* operation is GREATEST           */
    OPER_HEXTORAW,        /* operation is HEXTORAW           */
    OPER_INITCAP,         /* operation is INITCAP            */
    OPER_INSTR,           /* operation is INSTR              */
    OPER_LAST_DAY,        /* operation is LAST_DAY           */
    OPER_LEAST,           /* operation is LEAST              */
    OPER_LENGTH,          /* operation is LENGTH             */
    OPER_LOWER,           /* operation is LOWER              */
    OPER_LPAD,            /* operation is LPAD               */
    OPER_LTRIM,           /* operation is LTRIM              */
    OPER_MAX,             /* operation is MAX                */
    OPER_MIN,             /* operation is MIN                */
    OPER_MOD,             /* operation is MOD                */
    OPER_MONTHS_BETWEEN,  /* operation is MONTHS_BETWEEN     */
    OPER_MULT,            /* operation is multiply: *        */
    OPER_NEG,             /* operation is negative sign: -   */
    OPER_NESTED,          /* bracketed operation             */
    OPER_NEW_TIME,        /* operation is NEW_TIME           */
    OPER_NEXT_DAY,        /* operation is NEXT_DAY           */
    OPER_NLSSORT,         /* operation is NLSSORT            */
    OPER_NVL,             /* operation is NVL                */
    OPER_POS,             /* operation is positive sign: +   */
    OPER_POWER,           /* operation is POWER              */
    OPER_PRIOR,           /* operation is PRIOR              */
    OPER_RAWTOHEX,        /* operation is RAWTOHEX           */
    OPER_REPLACE,         /* operation is REPLACE            */
    OPER_ROUND,           /* operation is ROUND              */
    OPER_ROWIDTOCHAR,     /* operation is ROWIDTOCHAR        */
    OPER_RPAD,            /* operation is RPAD               */
    OPER_RTRIM,           /* operation is RTRIM              */
    OPER_SIGN,            /* operation is SIGN               */
    OPER_SOUNDEX,         /* operation is SOUNDEX            */
    OPER_SQRT,            /* operation is SQRT               */
    OPER_STDDEV,          /* operation is STDDEV             */
    OPER_SUB,             /* operation is substract: -       */
    OPER_SUBSTR,          /* operation is SUBSTR             */
    OPER_SUM,             /* operation is SUM                */
    OPER_TO_CHAR,         /* operation is TO_CHAR            */
    OPER_TO_DATE,         /* operation is TO_DATE            */
    OPER_TO_NUMBER,       /* operation is TO_NUMBER          */
    OPER_TRANSLATE,       /* operation is TRANSLATE          */
    OPER_TRUNC,           /* operation is TRUNC              */
    OPER_UPPER,           /* operation is UPPER              */
    OPER_USERENV,         /* operation is USERENV            */
    OPER_VARIANCE,        /* operation is VARIANCE           */
    OPER_VSIZE            /* operation is VSIZE              */
}
    TYPE_OPER;
```

```
typedef enum /* -- order mode -- */
{
    ORDER_EMPTY=0,  /* no order mode has been specified */
    ORDER_ASC,      /* order mode is ASC */
    ORDER_DESC      /* order mode is DESC */
}
    TYPE_ORDER;

typedef enum /* -- operations on queries -- */
{
    QUERYOP_EMPTY=0, /* initial TYPE_QUERYOP (error later) */
    QUERYOP_INTER,   /* operation is INTERSECT           */
    QUERYOP_MINUS,   /* operation is MINUS               */
    QUERYOP_UNION    /* operation is UNION               */
}
    TYPE_QUERYOP;

typedef enum /* -- select mode -- */
{
    SELECT_EMPTY=0,  /* no select mode has been specified */
    SELECT_ALL,      /* select mode is ALL      */
    SELECT_DISTINCT  /* select mode is DISTINCT */
}
    TYPE_SELECT;

typedef enum /* -- type of the structure -- */
{
    STRUCT_COLUMN=1,
    STRUCT_CONNECT,
    STRUCT_CONST,
    STRUCT_FIELD,
    STRUCT_FROM,
    STRUCT_GLOBAL,
    STRUCT_GROUP,
    STRUCT_HAVING,
    STRUCT_NODE,
    STRUCT_OPER,
    STRUCT_ORDER,
    STRUCT_ORDER_COL,
    STRUCT_SELECT,
    STRUCT_SET,
    STRUCT_TABLE,
    STRUCT_TEST,
    STRUCT_WHERE,
}
    TYPE_STRUCT;

typedef enum /* -- type of test in a predicate -- */
{
    TEST_EMPTY=0,   /* initial TYPE_TEST (error later)      */
    TEST_BETWEEN,   /* test is BETWEEN                      */
    TEST_EQ,        /* test is equal: =                     */
    TEST_EXISTS,    /* test is EXISTS                       */
    TEST_GE,        /* test is greater than or equal: >=    */
    TEST_GT,        /* test is greater than: >              */
    TEST_IN,        /* test is IN                           */
    TEST_LE,        /* test is less than or equal: <=       */
    TEST_LIKE,      /* test is LIKE                         */
    TEST_LT,        /* test is less than: <                 */
    TEST_NE,        /* test is not equal: !=                */
    TEST_NOT,       /* test is NOT primary                  */
    TEST_NULL,      /* test is IS NULL                      */
    TEST_START      /* test is START WITH in CONNECT BY     */
}
    TYPE_TEST;

typedef enum /* -- options in tests -- */
{
    TESTOPT_EMPTY=0, /* no test option has been specified */
    TESTOPT_ALL,     /* test option is ALL */
    TESTOPT_ANY,     /* test option is ANY */
    TESTOPT_NOT      /* test option is NOT */
}
    TYPE_TESTOPT;
```

```c
typedef enum /* test list in node structure */
{
    TEST_INPUT=1,   /* input test list */
    TEST_INTERN,    /* intern test list */
    TEST_OUTPUT     /* output test list */
}
    TEST_LIST;

#ifndef LIST_H
#include "list.h"
endif define YES      (char)1
define NO       (char)0
#define EXPLAIN  0
#define NET      1
#define O_CREAT  0x100
define O_RDWR   2 typedef struct s_Node {  /* -- struture to hold a node, a node can be:       */
                         /*    table, group, order, explain or query operation -- */
    TYPE_STRUCT     struct_type; /* = STRUCT_NODE                                  */
    TYPE_NODE       type;        /* type of the node: TABLE, GROUP, ...            */
    LIST            *input_nodes;/* list of the input nodes                        */
    struct s_Node   *output_node;/* the output node                                */
    LIST            *input_tests;/* list of the input tests                        */
    LIST            *output_tests;/* list of the output tests                      */
    LIST            *intern_tests;/* list of the internal tests                    */
    LIST            *proj;       /* list of projections                            */
    char            *info;       /* indicates the node structure: Table, Group, ...*/
    TYPE_SELECT     select_mode; /* indicates the select mode                      */
    TYPE_EXPLAIN    expl_oper;   /* explain operation, if node is an explain node  */
    TYPE_EXPL_OPT   expl_opt;    /* explain option, if node is an explain node     */
    LIST            *foo;        /*                                                */
    LIST            *children;   /* list of the children of the node in the graph  */
    LIST            *fields;     /* list of fields                                 */
    int             nested;      /* which branch is the nested select              */
} Node;

typedef struct s_Oper { /* -- the arithmetic operation (or function) structure -- */
    TYPE_STRUCT     struct_type; /* = STRUCT_OPER                                 */
    TYPE_OPER       type;        /* type of the operation                         */
    TYPE_SELECT     mode;        /* grouping mode if funct : ALL, DISTINCT        */
    char            *alias;      /* alias of the selected column                  */
    struct s_Oper   *first;      /* first operand                                 */
    struct s_Oper   *second;     /* second operand, if any                        */
    float           select;      /* selectivity of this operation                 */
} Oper;

typedef struct s_Column {  /* -- the column structure -- */
    TYPE_STRUCT     struct_type; /* = STRUCT_COLUMN                               */
    Oper            *oper;       /* operand structure of the test                 */
    LIST            *funct;      /* list of functions in the column, e.g. AVG, SUM*/
    LIST            *fields;     /* list of fields in the column                  */
} Column;

typedef struct s_Const { /* -- the constant structure -- */
    TYPE_STRUCT     struct_type; /* = STRUCT_CONST                                */
    TYPE_CONST      type;        /* type of the constant, e.g. int, real, string  */
    char            *value;      /* string representing the value of the constant */
    char            *alias;      /* alias of the constant in the select           */
} Const;

typedef struct s_Field { /* -- the field structure -- */
    TYPE_STRUCT     struct_type; /* = STRUCT_FIELD                                */
    char            *table_name; /* name of the table owning the field            */
    char            *owner;      /* name of the owner the table                   */
    char            *name;       /* name of the field (it can be '*')             */
    char            *alias;      /* alias of the field in the select              */
    TYPE_COL        type;        /* type of the field                             */
    int             precision;   /* length : digit or character number            */
                                 /* not length of the column in bytes             */
    int             scale;       /* digits to right of decimal point              */
    float           select;      /* selectivity on this column                    */
} Field;
```

```
typedef struct s_From {  /* -- the FROM structure -- */
    TYPE_STRUCT  struct_type; /* = STRUCT_FROM         */
    LIST         *tables;     /* list of tables nodes  */
} From;

typedef struct s_Global {  /* -- this struture represents the whole graph -- */
    TYPE_STRUCT  struct_type;  /* = STRUCT_GLOBAL                              */
    Node         *term;        /* terminal node (from which comes the result) */
    LIST         *param_tests; /* parametrised tests                           */
    LIST         *nodes;       /* all the nodes of the graph                   */
    LIST         *tests;       /* all the tests of the graph                   */
} Global;

typedef struct s_Group {  /* -- the GROUP BY structure -- */
    TYPE_STRUCT  struct_type; /* = STRUCT_GROUP                                */
    LIST         *fields;     /* list of the fields of the GROUP BY (by order) */
    LIST         *funct;      /* list of functions to be computed              */
} Group;

typedef struct s_Having {  /* -- the HAVING structure -- */
    TYPE_STRUCT  struct_type;   /* = STRUCT_HAVING                              */
    LIST         *intern_tests; /* list of the tests of the HAVING              */
    LIST         *funct;        /* list of functions used by the above tests    */
    LIST         *nodes;        /* list of nodes from the nested SELECTs, if any */
    LIST         *tests;        /* list of tests from the nested SELECTs, if any */
} Having;

typedef struct s_Order {  /* -- the ORDER BY structure -- */
    TYPE_STRUCT  struct_type; /* = STRUCT_ORDER                              */
    LIST         *columns;    /* list of columns representing the sort order */
} Order;

typedef struct s_Order_Col {  /* -- the column specified in order clause -- */
    TYPE_STRUCT  struct_type; /* = STRUCT_ORDER_COL                 */
    char         *table_name; /* name of the table owning the column */
    char         *name;       /* name of the column                 */
    char         *num;        /* number of the field                */
    TYPE_ORDER   mode;        /* the order mode : ASC, DESC         */
} Order_Col;

typedef struct s_Select {  /* -- the SELECT structure -- */
    TYPE_STRUCT  struct_type; /* = STRUCT_SELECT                    */
    TYPE_SELECT  mode;        /* mode of selection, e.g. ALL, UNIQUE */
    LIST         *proj;       /* list of projection operations       */
    LIST         *funct;      /* list of functions, e.g. COUNT, AVG  */
    LIST         *fields;     /* list of fields of projection        */
} Select;

typedef struct s_Set {  /* -- the SET structure -- */
    TYPE_STRUCT  struct_type; /* = STRUCT_SET                       */
    TYPE_TESTOPT all_any;     /* ALL/ANY flag                       */
    LIST         *values;     /* list of values                     */
    LIST         *fields;     /* list of fields in the values       */
    LIST         *funct;      /* list of function in the values     */
} Set;

typedef struct s_Table {  /* -- description of a table -- */
    TYPE_STRUCT  struct_type; /* = STRUCT_TABLE                               */
    char         *table_name; /* name of the table or index                   */
    char         *owner;      /* owner of the table                           */
    char         *alias;      /* alias name for the table or table name for index */
    int          explain;     /* number of the explain node                   */
    int          range;       /* range of appearance of the table in the query */
    LIST         *fields;     /* list of the fields of the table or index     */
    float        select;      /* selectivity on this table                    */
} Table;
```

```
typedef struct s_Test {    /* -- this structure represents a test -- */
    TYPE_STRUCT    struct_type;   /* = STRUCT_TEST                                       */
    TYPE_TEST      type;          /* type of test                                        */
    TYPE_TESTOPT   option;        /* option of the test: ALL, ANY, ...                   */
    int            or_left;       /* OR number in which this test is left side           */
    int            or_right;      /* OR number in which this test is right side          */
    char           nested;        /* is it a nested test: IN, EXISTS, ...                */
    Oper           *first;        /* first operand                                       */
    Oper           *second;       /* second operand, if any                              */
    Oper           *third;        /* third operand, for the between                      */
    LIST           *nodes;        /* list of the nodes owning a field in the test        */
    LIST           *fields;       /* list of the fields of the test                      */
    Node           *node          /*                                                     */
    char           find_nested;   /* indicates if the branch has been visited            */
    float          select;        /* selectivity of this test                            */
} Test;

typedef struct s_Where {   /* -- the WHERE structure -- */
    TYPE_STRUCT    struct_type;   /* = STRUCT_WHERE                                      */
    LIST           *intern_tests; /* list of internal tests                              */
    LIST           *param_tests;  /* list of tests from the nested Selects               */
    LIST           *nodes;        /* list of all nodes from the nested Selects           */
    LIST           *tests;        /* list of all tests in the where clause               */
    LIST           *funct;        /* list of functions: AVG, SUM, ...                    */
} Where;

typedef struct s_Connect { /* -- the connect structure -- */
    TYPE_STRUCT    struct_type;   /* = STRUCT_CONNECT                                    */
    Test           *connect_by;   /* the connect by condition                            */
    Where          *start_with;   /* the start with condition                            */
} Connect;

/* === end of file struct.h === */
```

I claim:

1. A method of displaying information representative of a query for a relational database management system (RDBMS) having screen display means, the query comprising a first portion used by the RDBMS to determine a query execution plan and a second portion comprising elements, the query execution plan comprising operations to be executed by the RDBMS, the operations being interconnected through links, said method comprising:

generating a first set of information representative of the query execution plan, said first set of information including operation names for the respective operations of the query execution plan, possible options and at least one characteristic of each of the operations;

analyzing said first set of information to select selected information including said operation names, said possible options, said at least one characteristics and the links;

performing a syntactical analysis of the query;

forming a syntactical graph from said syntactical analysis, said syntactical graph comprising a second set of information including at least one of said elements of said second portion of the query;

comparing said selected information from said first set of information with second set of information to select said at least one element;

and displaying on said screen display means:
said operations in boxes respectively, each of said boxes incorporating said related operation name, possible option and said characteristic;
links (28) between said boxes by a linear graphical form; and
said at least one element inside at least one box of said boxes.

2. The method of claim 1, wherein said syntactical graph has nodes and said second set of information further includes types of said respective nodes of the syntactical graph and said syntactical analysis comprises analyzing operation of the RDBMS to determine said types.

3. The method of claim 2, wherein the RDBMS performs operations in a predetermined order and said syntactical analysis further comprises determining said operations of the RDBMS and said order of said operations.

4. The method of claim 3, wherein said second set of information further comprises an information associated with said types.

5. The method of claim 2, wherein said second set of information further comprises information associated with said types.

6. The method of claim 1, wherein said first set of information has nodes and said syntactical graph also has nodes and said step of comparing comprises associating said nodes of said first set of information with said nodes of said syntactical graph and placing projections and tests on nodes of said first set of information.

7. The method of claim 6, wherein the RDBMS performs operations in a predetermined order and said step of association of said nodes of said first information with said nodes of said syntactical graph comprises distinguishing between predictable operations and unpredictable operations from said operations performed by the RDBMS, associating predictable nodes of said first set of information with said predictable nodes of said syntactical graph, with unpredictable nodes constituting links between said associated predictable nodes.

8. Tool for displaying information representative of a query for a relational database management system (RDBMS) having screen display means, the query comprising a first portion used by the RDBMS to determine a query execution plan and a second portion comprising elements, the query execution plan comprising operations to be executed by the RDBMS, the operations being interconnected through links, said tool comprising:

input means for a first set of information representative of the query execution plan, said first set of information including operation names for the respective operations of the query execution plan, possible options and at least one characteristic of each of the operations, means for analyzing said first set of information to select selected information including said operation names, said possible options, said at least one characteristic and the links, means for performing a syntactical analysis of the query, means for forming a syntactical graph from said syntactical analysis, said syntactical graph comprising a second set of information including at least one of the elements of the second portion of the query, means for comparing said selected information from said first set of information with said second set of information to select said at least one element, and means for displaying on said screen display means:
said operations in boxes respectively, each box respectively incorporating said operation name, said possible option and said at least one characteristic;
said links between said boxes by a linear graphical form; and
said at least one element inside at least one box of said boxes.

9. The tool of claim 8, wherein said syntactical graph has nodes and said second set of information further includes types of said respective nodes of the syntactical graph, and said means for performing a syntactical analysis comprises means for analyzing operation of the RDBMS to determine said types.

10. The tool of claim 9, wherein the RDBMS performs operations in a predetermined order and said means for performing a syntactical analysis further comprises means for determining said operations of the RDBMS and said order of said operations.

11. The tool of claim 10, wherein said second set of information further comprises an information associated with said types.

12. The tool of claim 9, wherein said second set of information further comprises information associated with said types.

13. The tool of claim 88, wherein said first set of information has nodes and said syntactical graph also has nodes and said means for comparing comprises means for associating said nodes of said first set of information with said nodes of said syntactical graph and placing projections and tests on nodes of said first set of information.

14. The tool of claim 13, wherein the RDBMS performs operations in a predetermined order and said means for association of said nodes of said first information with said nodes of said syntactical graph comprises means for distinguishing between predictable operations and unpredictable operations from said operations performed by the RDBMS, means for associating predictable nodes of said first set of information with said predictable nodes of said syntactical graph, with unpredictable nodes constituting links between said associated predictable nodes.

* * * * *

UNITED STATES PATENT AND TRADEMARK OFFICE
CERTIFICATE OF CORRECTION

PATENT NO. : 5,495,605
DATED : Feb. 27, 1996
INVENTOR(S) : Michel CADOT

It is certified that error appears in the above-indentified patent and that said Letters Patent is hereby corrected as shown below:

Column 32, line 50, (Claim 13, line 1) "claim 88" should read -- claim 8 --.

Signed and Sealed this

Twenty-fifth Day of June, 1996

*Attest:*

BRUCE LEHMAN

*Attesting Officer*   *Commissioner of Patents and Trademarks*